(12) United States Patent
Cherian et al.

(10) Patent No.: US 9,439,067 B2
(45) Date of Patent: Sep. 6, 2016

(54) SYSTEMS AND METHODS OF PERFORMING LINK SETUP AND AUTHENTICATION

(76) Inventors: George Cherian, San Diego, CA (US); Philip Michael Hawkes, Warrimoo (AU); Santosh Paul Abraham, San Diego, CA (US); Hemanth Sampath, San Diego, CA (US)

( * ) Notice: Subject to any disclaimer, the term of this patent is extended or adjusted under 35 U.S.C. 154(b) by 0 days.

(21) Appl. No.: 13/610,730

(22) Filed: Sep. 11, 2012

(65) Prior Publication Data

US 2013/0263223 A1  Oct. 3, 2013

Related U.S. Application Data

(60) Provisional application No. 61/533,627, filed on Sep. 12, 2011, provisional application No. 61/535,234, filed on Sep. 15, 2011, provisional application No. 61/583,052, filed on Jan. 4, 2012, provisional (Continued)

(51) Int. Cl.
*G06F 7/04* (2006.01)
*G06F 15/16* (2006.01)
*G06F 17/30* (2006.01)

(Continued)

(52) U.S. Cl.
CPC ............ *H04W 12/04* (2013.01); *H04L 9/0869* (2013.01); *H04L 9/3273* (2013.01); *H04L 63/062* (2013.01); *H04L 63/0892* (2013.01);

(Continued)

(58) Field of Classification Search
CPC ............... H04W 12/06; H04W 12/04; H04W 36/0055; H04W 84/12; H04L 63/0823; H04L 2209/80; H04L 63/062; H04L 9/0869

USPC ........ 713/150–168, 175, 176, 169; 726/3–7; 455/411; 370/331
See application file for complete search history.

(56) References Cited

U.S. PATENT DOCUMENTS 7,236,477 B2    6/2007   Emeott et al.
7,275,157 B2 *  9/2007   Cam Winget ................. 713/168

(Continued)

FOREIGN PATENT DOCUMENTS

CN    101296081 A    10/2008
EP    1555843 A1     7/2005

(Continued)

OTHER PUBLICATIONS

Nathjiri, M. "Keying and signaling for wireless access and handover using EAP (EAP-HR)." draft-nakhjiri-hokey-hierarchy-04—Keying and signaling for wireless access and handover using EAP (EAP-HR). Version 4. The IETF Trust, Apr. 5, 2007. Web. Jan. 10, 2014. <http://tools.ietf.org/html/draft-nakhjiri-hokey-hierarchy-04>.*
Park, S., P. Kim, and B. Volz. "Rapid Commit Option for the Dynamic Host Configuration Protocol Version 4 (DHCPv4)." RFC 4039—Rapid Commit Option for the Dynamic Host Configuration Protocol version 4 (DHCPv4). The Internet Society, n. d. Web. Jan. 10, 2014. http://tools.ietf.org/html/rfc4039.*

(Continued)

*Primary Examiner* — Ali Abyaneh
*Assistant Examiner* — Feliciano Mejia
(74) *Attorney, Agent, or Firm* — Sayed H. Beladi

(57) ABSTRACT

Systems and methods of performing link setup and authentication are disclosed. A first method utilizes an unprotected association request and an association response that includes an access point nonce (ANonce). A second method includes receiving, during a first link setup using a first ANonce, a second ANonce for use in a second link setup. A third method utilizes a temporary key to protect an association request. A fourth method includes generating an ANonce at a mobile device based on an ANonce-seed received from an access point.

19 Claims, 28 Drawing Sheets

Related U.S. Application Data application No. 61/606,794, filed on Mar. 5, 2012, provisional application No. 61/611,553, filed on Mar. 15, 2012, provisional application No. 61/645,987, filed on May 11, 2012.

(51) Int. Cl.

| H04L 29/06 | (2006.01) |
|---|---|
| H04W 12/04 | (2009.01) |
| H04L 9/08 | (2006.01) |
| H04L 9/32 | (2006.01) |
| H04W 12/06 | (2009.01) |
| H04W 84/02 | (2009.01) |

(52) U.S. Cl.
CPC .......... *H04W12/06* (2013.01); *H04L 2209/80* (2013.01); *H04W 84/02* (2013.01)

(56) References Cited

U.S. PATENT DOCUMENTS

| 7,370,350 | B1* | 5/2008 | Salowey ............... 726/7 |
| 7,395,427 | B2 | 7/2008 | Walker |
| 7,409,545 | B2 | 8/2008 | Perlman |
| 7,483,409 | B2 | 1/2009 | Zheng |
| 7,555,783 | B2 | 6/2009 | Enright |
| 7,558,866 | B2 | 7/2009 | Choe et al. |
| 7,574,599 | B1 | 8/2009 | Zhang |
| 7,624,271 | B2 | 11/2009 | Sood et al. |
| 7,646,872 | B2 | 1/2010 | Brown et al. |
| 7,747,865 | B2 | 6/2010 | Krawczyk |
| 7,890,745 | B2* | 2/2011 | Qi et al. .............. 713/150 |
| 7,908,482 | B2 | 3/2011 | Lauter et al. |
| 7,983,418 | B2 | 7/2011 | Oyama et al. |
| 8,204,502 | B2 | 6/2012 | Khetawat et al. |
| 8,413,213 | B2* | 4/2013 | Glickman ............... 726/3 |
| 8,578,159 | B2 | 11/2013 | Emeott et al. |
| 8,594,632 | B1* | 11/2013 | Azizi et al. ............ 455/411 |
| 8,881,305 | B2 | 11/2014 | Salomone |
| 2005/0130659 | A1 | 6/2005 | Grech et al. |
| 2006/0067526 | A1 | 3/2006 | Faccin et al. |
| 2006/0121883 | A1 | 6/2006 | Faccin |
| 2006/0128362 | A1 | 6/2006 | Bae et al. |
| 2008/0201765 | A1 | 8/2008 | Walter et al. |
| 2008/0298595 | A1 | 12/2008 | Narayanan et al. |
| 2009/0052674 | A1* | 2/2009 | Nishida et al. ......... 380/278 |
| 2010/0189258 | A1 | 7/2010 | Kassab et al. |
| 2010/0223655 | A1 | 9/2010 | Zheng |
| 2010/0232407 | A1 | 9/2010 | Navali et al. |
| 2011/0113252 | A1 | 5/2011 | Krischer et al. |
| 2011/0154039 | A1 | 6/2011 | Liu et al. |
| 2011/0296494 | A1 | 12/2011 | Muller et al. |
| 2012/0159576 | A1 | 6/2012 | Wang et al. |
| 2013/0125226 | A1 | 5/2013 | Shah et al. |
| 2013/0243194 | A1 | 9/2013 | Hawkes et al. |
| 2013/0247150 | A1 | 9/2013 | Cherian et al. |
| 2014/0162606 | A1 | 6/2014 | Cherian et al. |
| 2014/0164763 | A1 | 6/2014 | Cherian et al. |

FOREIGN PATENT DOCUMENTS

| JP | H04129441 A | 4/1992 |
| JP | 2004015813 A | 1/2004 |
| JP | 2005354249 A | 12/2005 |
| JP | 2009522828 A | 6/2009 |
| JP | 2010219853 A | 9/2010 |
| KR | 20080041277 A | 5/2008 |
| WO | 2006120316 A1 | 11/2006 |
| WO | 2007034322 A1 | 3/2007 |
| WO | 2010023506 A1 | 3/2010 |

OTHER PUBLICATIONS

Nakhjiri, M. "Keying and signaling for wireless access and handover using EAP (EAP-HR)." draft-Nakhjiri-hokey-hierarchy-04—Keying and signaling for wireless access and handover using EAP (EAP-HR). Version 4. The IETF Trust, Apr. 5, 2007. Web. Jan. 10, 2014. http://tools.ietf.org/html/draft-Nakhjiri-hokey-hierarchy-04 hereinafter referred to as Nakh.*

Park, S., P. Kim, and B. Volz. "Rapid Commit Option for the Dynamic Host Configuration Protocol Version 4 (DHCPv4)." RFC 4039—Rapid Commit Option for the Dynamic Host Configuration Protocol version 4 (DHCPv4). The Internet Society, n. d. Web. Jan. 10, 2014. http://tools.ietf.org/html/rfc4039 hereinafter referred to as Park.*

Rodolphe Marques and Andre Zuquete. 2008. Fast, secure handovers in 802.11: back to the basis. In Proceedings of the 4th ACM symposium on QoS and security for wireless and mobile networks (Q2SWinet Oct. 27-28, 2008), Web Access Aug. 7, 2015. ACM, New York, NY, USA, pp. 27-34. DOI=10.1145/1454586. 1454592 http://doi.acm.org/10.1145/1454586.1454592.*

Cherian George (QUALCOMM INC): "Fast Re-authentication ; 11-11-1160-00-00ai-fast-re-authentication" IEEE Draft;IEEE-SA Mentor, Piscataway, NJ USA, vol. 802.11ai, Sep. 5, 2011, pp. 1-8, XP017673791, [retrieved on Sep. 5, 2011].

Csr et al., "Fast authentication in TGai", IEEE 802.11-11/1160r6, Qualcomm Allied Telsis, Jan. 2012, 32 pages.

Eronen, P., et al., "Pre-Shared Key Ciphersuites for Transport Layer Security (TLS); rfc4279.txt", Dec. 1, 2005, XP015043208, ISSN: 0009-0003 p. 6, paragraph 3—p. 7.

International Search Report and Written Opinion—PCT/US2012/054874—ISA/EPO—Feb. 6, 2013.

Krawczyk, H., et al., "SKEME: a versatile secure key exchange mechanism for Internet", Network and Distributed System Security, 1996., Proceedings of the Sym P0sium on San Diego, CA, Lisa Feb. 22-23, 1996, Los Alamitos, CA, USA, IEEE C0mput. S0c, US, Feb. 22, 1996, pp. 114-127, XP010158990, DOI: 10.1109/NDSS.1996. 492418 ISBN: 978-0-8186-7222-4 p. 114, paragraph 1—col. 123, paragraph 3.

Kuo, F.C., et al., "Comparison Studies between Pre-Shared and Public Key Exchange Mechanisms for Transport Layer Security", INFOCOM 2006. 25TH IEEE International Conference on Computer Communications. Proceedings, IEEE, Piscataway, NJ, Apr. 1, 2006, pp. 1-6, XP031072092, DOI: 10.1109/INFOCOM.2006.115 ISBN: 978-1-4244-0221-2.

Morioka Hitoshi, "TGai Authentication Protocol Proposal ; 11-11-0976-02-00ai-tgai-authentication-protocol-proposal", IEEE Draft; IEEE-SA Mentor, Piscataway, NJ USA, vol. 802.11ai, No. 2, Jul. 21, 2011, pp. 1-24, XP017674098, [retrieved on Jul. 21, 2011].

Parikh H., et al., "Seamless Handover of Mobile Terminal from WLAN to cdma2000 Network", World Wireless Congress, XX, XX, May 30, 2003, pp. 1-6, XP002295002.

Partial International Search Report—PCT/US2012/054874—ISA/EPO—Jan. 11, 2013.

Qualcomm, Allied Telsis, CSRetaL; "Fast Aiithetication in TGai"; Jan. 16, 2012; doc.: IEEE 802.11-11/1160r5 retrieved from: https://www.google.com/url?sa=t&rct=j&q=&esrc=s&source=web& cd=1& cad=rja&uact=8& ved=0ahUKEwjj097R177 MAhXEph4KHVznCFUQFggMAA& url=https%3A%2F%2Fmentor.ieee.org%2F802. 11%2Fdcn%2F11%2F11-11-1160-005-00ai-fast-re-authetication. pptx&usg=AFQjCNGclgvEmeLY3acAw--nx5_PGUo4kQ& sig2=_r-YpRxSNLE38LlgXckmWw&bvm=bv.121070826,d.dmo.

Barker E., et al., "Recommendation for Random Number Generation Using Deterministic Random Bit Generators", NIST Special Publication 800-90, Mar. 1, 2007, pp. 1-133, XP055042437.

Sood K, "Just-In-Time 2 Phase Association TGr Proposal for Fast BSS Transition Proposal; 11-04-1170-00-000r-just-in-time-2-phase-association-fast-bss-transition-proposal", IEEE-SA Mentor, Piscataway, NJ USA, vol. 802.11r, Oct. 15, 2004, pp. 1 -60, XP017690097.

Cherian G (QUALCOMM INC): Fast Re-authentication, IEEE 802.11-11/1160r1, IEEE Standards Association, Sep. 12, 2011, 1-12 slides, URL, https://mentor.ieee.org/802.11/documents?is_ dcn=Fast%20Re-authentication&is_group=00ai&is_year=2011.

Fang P, et al., "Using Upper Layer Message IE in TGai", IEEE 802.11-11/01047r1, IEEE Standards Association, Jul. 19, 2011,

(56) References Cited

OTHER PUBLICATIONS 1-10 slides, URL: https://mentor.ieee.org/802.11/documents?is_dcn=Using%20Upper%20Layer%20Message%20IE%20in 20TGai& is_group=00ai&is_year=2011.

European Search Report—EP14183535—Search Authority—Berlin—Dec. 22, 2014.

European Search Report—EP14183539—Search Authority—Berlin—Dec. 22, 2014.

Khan K.N., et al., "Wireless Handoff Optimization: A Comparison of IEEE 802.11r and HOKEY," EUNICE'10 Proceedings of the 16th EUNICE/IFIP WG 6.6 conference on Networked Services and Applications: Engineering, Control and Management, 2010, pp. 118-131.

Cherian-G., et al., "Fast Authentication in TGai", [online], May 2012, doc.:IEEE 802.11-11/1160r9, Slide 1-40, [retrieved on Aug. 21, 2015]. Retrieved from the Internet, URL, https://www.google.com/url?sa=t&rct=j&q=&esrc=s&source=web&cd=1&cad=rja&uact=8&ved=0ahUKEwjQ4pDZn77MAhVKWz4KHTCcBisQFggcMAA&url=https%3A%2F%2Fmentor.ieee.org%2F802.11%2Fdcn%2F11%2F11-11-1160-09-00ai-fast-re-authentication.pptx&usg=AFQjCNHFk4pxWSdtK_0V6iP9ttVL3ADO-w&sig2=ZySEwc2acMVfjp3fE1_H8g&bvm=bv.121070826,d.dmo.

IEEE Standard for Information technology—Telecommunications and information exchange between systems—Local and metropolitan area networks—Specific requirements, Published Jun. 12, 2007, Accessed Oct. 13, 2015, http://ieeexplore.ieee.org/xpl/articleDetails.jsp?arnumber=4432353.

IEEE Standard for Information technology—Telecommunications and information exchange between systems—Local and metropolitan area networks—Specific requirements, published Jul. 23, 2004, accessed Oct. 13, 2015, http://ieeexplore.ieee.org/xpl/articleDetails.jsp?arnumber=1318903, doi: 10.1109/IEEESTD.2004.94585.

Narayanan, et al., "EAP Extensions for EAP Re-Authentication Protocol (ERP)," Aug. 2008, pp. 1-43, Network Working Group—Request for Comments: 5296, Qualcomm Inc.

* cited by examiner

FIG. 4 (Option 1)

FIG. 5 (Option 1a)

FIG. 6 (Option 1b)

FIG. 7 (Option 2)

FIG. 8 (Option 2a)

FIG. 9 (Option 2b)

FIG. 10 (Option 3)

FIG. 11 (Option 5)

SYSTEMS AND METHODS OF PERFORMING LINK SETUP AND AUTHENTICATION

CROSS-REFERENCE TO RELATED APPLICATIONS

The present application claims priority from commonly owned U.S. Provisional Patent Application No. 61/533,627 filed Sep. 12, 2011, U.S. Provisional Patent Application No. 61/535,234 filed Sep. 15, 2011, U.S. Provisional Patent Application No. 61/583,052 filed Jan. 4, 2012, U.S. Provisional Patent Application No. 61/606,794 filed Mar. 5, 2012, and U.S. Provisional Patent Application No. 61/645,987 filed May 11, 2012, and U.S. Provisional Patent Application No. 61/611,553 filed Mar. 15, 2012, the contents of which are expressly incorporated herein by reference in their entirety. Moreover, the contents of the non-provisional application titled: WIRELESS COMMUNICATION USING CONCURRENT RE-AUTHENTICATION AND CONNECTION SETUP, filed on Sep. 11, 2012, granted as U.S. Pat. No. 9,143,937, and the non-provisional application titled: SYSTEMS AND METHODS FOR ENCODING EXCHANGES WITH A SET OF SHARED EPHEMERAL KEY DATA, filed on Sep. 11, 2012, granted as U.S. Pat. No. 8,837,741 are incorporated by reference herein.

BACKGROUND

1. Field

The following relates generally to wireless communication and more specifically to link setup and authentication processes in wireless communication.

2. Description of Related Art

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Wireless communication networks enable communication devices to transmit and/or receive information while on the move. These wireless communication networks may be communicatively coupled to other public or private networks to enable the transfer of information to and from the mobile access terminal. Such communication networks typically include a plurality of access points (AP) which provide wireless communication links to access terminals (e.g., mobile communication devices, mobile phones, wireless user terminals). The access points may be stationary (e.g., fixed to the ground) or mobile (e.g., mounted on vehicles, satellites, etc.) and positioned to provide wide area of coverage as the access terminal moves within the coverage area.

Portable devices may be configured to communicate data via these wireless networks. For example, many devices are configured to operate according to an Institute of Electrical and Electronics Engineers (IEEE) 802.11 specification that enables wireless exchange of data via an access point. In some communication systems, when a mobile access terminal attaches to a communication network through an access point, it performs network access authentication. Each time a mobile access terminal connects to a different access point, the authentication process may need to be repeated. However, repeating this authentication process can introduce significant setup delays.

Many communication devices are configured to perform a link setup both at an initial connection stage and one or more reconnection stages. Current systems assume pre-shared key to AP-IP address assignment after authentication to protect IP address assignments.

While utilization of multiple messages communicated among two or more message processing points in the system allows link setup, reducing the number of messages communicated while maintaining a required authentication level of the communication is highly desired.

Furthermore, a mobile communication device may scan for a nearby access point before link setup can be performed. This scanning may be "passive" or "active." In "passive" scanning, the device may listen for access point activity (e.g., a control message). In "active" scanning, the device may broadcast a query and then wait for responses from nearby access points. Thus, "passive" scanning may be time consuming and "active" scanning may consume both time as well as power at the mobile communication device.

BRIEF DESCRIPTION OF THE DRAWINGS

Various features, nature and advantages may become apparent from the detailed description set forth below when taken in conjunction with the drawings in which like reference characters identify correspondingly similar elements throughout.

DETAILED DESCRIPTION

Figure 1:
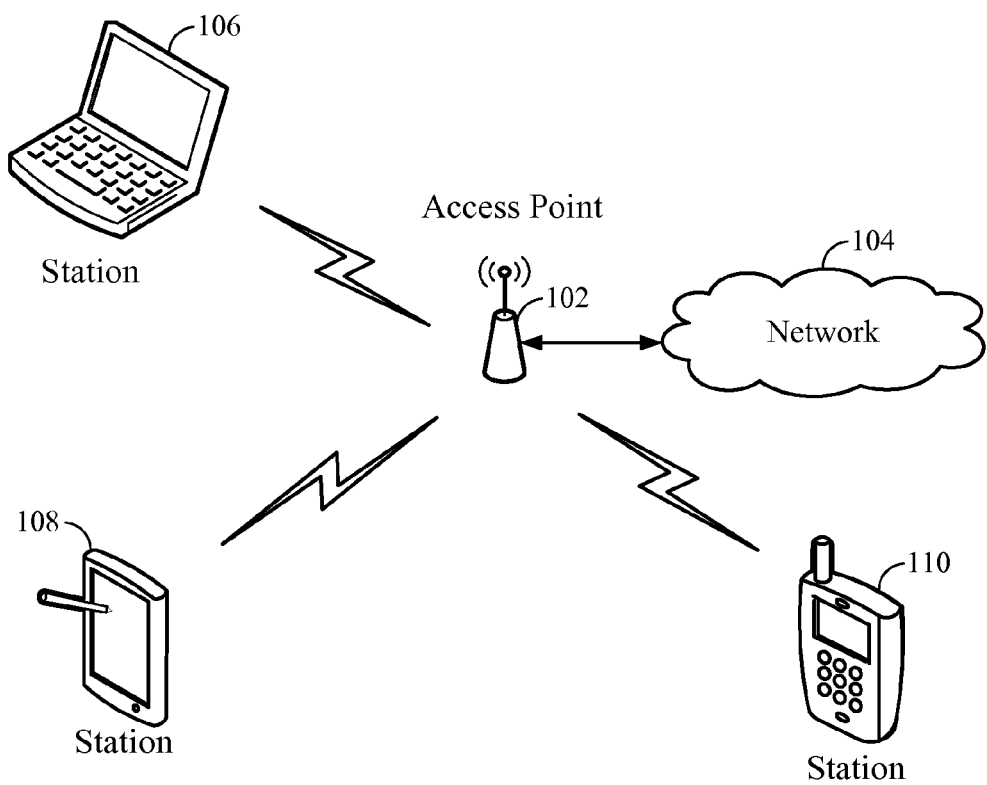
FIG. 1 is a conceptual diagram illustrating an example of a wireless network.

In the following description, reference is made to the accompanying drawings in which is shown, by way of illustration, specific embodiments in which the disclosure may be practiced. The embodiments are intended to describe aspects of the disclosure in sufficient detail to enable those skilled in the art to practice the invention. Other embodiments may be utilized and changes may be made to the disclosed embodiments without departing from the scope of the disclosure. The following detailed description is not to be taken in a limiting sense, and the scope of the present invention is defined only by the appended claims.

Features and aspects described herein provide devices and methods for a fast setup time during a re-authentication process of a connection setup. For example, the described techniques may enable a mobile device (e.g., station (STA)) to perform link setup with respect to an access point (AP) without first listening for a beacon or soliciting a probe response from the access point. The beacon or probe response may typically include an access point nonce (ANonce) to be used during link setup. Thus, the described techniques may enable the STA to perform link setup without having previously received the ANonce. In accordance with a "modified 4-way handshake" technique the STA may send an unprotected association request to the AP and may receive the ANonce from the AP in an association response. The received ANonce may then be used for key derivation. In accordance with a "next ANonce" technique the STA may receive, during a first link setup initiated using a first ANonce, a second ANonce for use in a second link setup subsequent to the first link setup.

The described techniques may also enable the use of a temporary key for upper layer signaling protection. For example, instead of sending an unprotected association request, a STA may receive a first ANonce (e.g., ANonce1) via a beacon or a probe response from an AP and may derive a first key (e.g., a first pairwise transient key (PTK)) based on the first ANonce. The first key may be used to protect the association request sent by the STA to the AP. In response to receiving the association request, the AP may generate a second ANonce (e.g., ANonce2) and may derive a second key (e.g., a second PTK) based on the second ANonce. The AP may transmit an association response to the STA that includes the second ANonce and that is protected using the second key. The STA may derive the second key based on the second ANonce and may use the second key to process the association response and complete link setup. The second key may also be used to protect subsequent messages (e.g., data messages) communicated between the STA and the AP.

Alternately, instead of receiving an ANonce from the AP via a beacon or probe response, the STA may receive an ANonce-seed in the beacon or probe response. The ANonce-seed may be a cryptographic seed value that is frequently updated by the AP. The STA may generate an ANonce by hashing the ANonce-seed with the media access control (MAC) address of the STA. Thus, unlike an ANonce that is broadcasted to multiple STAs via a beacon message, the ANonce generated at the STA based on the ANonce-seed and the STA's MAC address may be unique to the STA. The generated ANonce may be used by the STA to initiate a link setup with the AP. During the link setup, the AP may generate the ANonce based on the ANonce-seed and the MAC address of the STA, which may be included in link setup messages (e.g., an association request) from the STA. It will be noted that in contrast to other handshaking techniques, this technique may involve the STA generating the ANonce before the AP. Advantageously, the ANonce may be unique to the STA, may be sent "in the clear" (i.e., unencrypted), and may not be predictable by unauthorized devices before transmission by the AP.

In a particular embodiment, a method includes sending an unprotected association request from a mobile device to an access point. The method also includes receiving an association response from the access point, where the association response includes an ANonce. The method includes generating, at the mobile device, a pairwise transient key (PTK) using the ANonce.

In another particular embodiment, an apparatus includes a processor and a memory storing instructions executable by the processor to send an unprotected association request to an access point and to receive an association response from the access point, where the association response includes an ANonce. The instructions are also executable by the processor to generate a PTK using the ANonce.

In another particular embodiment, a method includes, at an access point, receiving an unprotected association request from a mobile device. The method also includes extracting an initiate message from the unprotected association request and sending the initiate message to an authentication server. The method further includes receiving an answer message from the authentication server, where the answer message includes a re-authentication master session key (rMSK). The method includes generating an ANonce and sending an association response to the mobile device, where the association response includes the ANonce.

In another particular embodiment, an apparatus includes a processor and a memory storing instructions executable by the processor to receive an unprotected association request from a mobile device. The instructions are also executable by the processor to extract an initiate message from the unprotected association request and to send the initiate message to an authentication server. The instructions are further executable by the processor to receive an answer message from the authentication server, where the answer message includes a rMSK. The instructions are executable by the processor to generate an ANonce and to send an association response to the mobile device, where the association response includes the ANonce.

In another particular embodiment, a method includes initiating, at a mobile device, a first link setup with an access point using a first ANonce. The method also includes receiving, during the first link setup with the access point, a second ANonce for use in a second link setup with the access point subsequent to the first link setup, where the second ANonce is distinct from the first ANonce.

In another particular embodiment, an apparatus includes a processor and a memory storing instructions executable by the processor to initiate a first link setup with an access point using a first ANonce. The instructions are also executable by the processor to receive, during the first link setup with the access point, a second ANonce for use in a second link setup with the access point subsequent to the first link setup, where the second ANonce is distinct from the first ANonce.

In another particular embodiment, a method includes sending, from an access point to a mobile device during a first link setup that uses a first ANonce, a second ANonce for use in a second link setup with the mobile device subsequent to the first link setup, where the second ANonce is distinct from the first ANonce.

In another particular embodiment, an apparatus includes a processor and a memory storing instructions executable by the processor to send, to a mobile device during a first link setup that uses a first ANonce, a second ANonce for use in a second link setup with the mobile device subsequent to the first link setup, where the second ANonce is distinct from the first ANonce.

In another particular embodiment, a method includes receiving, at a mobile device, a first ANonce from an access point. The method also includes generating a first PTK using the first ANonce. The method further includes sending an association request to the access point, where the association request includes a SNonce and is protected using the first PTK. The method includes receiving an association response from the access point, where the association response includes a second ANonce and is protected using a second PTK. The method also includes generating the second PTK using the second ANonce and the SNonce. The method further includes using the second PTK to protect at least one subsequent message to be sent to the access point.

In another particular embodiment, an apparatus includes a processor and a memory storing instructions executable by the processor to generate, at an access point, an ANonce-seed to be sent to a mobile device. The instructions are also executable by the processor to generate an ANonce based on the ANonce-seed and a MAC address of the mobile device that is received from the mobile device. The instructions are further executable by the processor to perform a link setup with the mobile device based on the generated ANonce.

In wireless networks such as 802.11 (WiFi) networks, a mobile user may move from one network to another. In some cases the networks may be managed by a same network carrier or entity.

Some non-limiting examples of such use cases are:

1. Hot-Spot Pass-Through (A) A user may pass by (several, non-overlapping) publicly accessible WiFi hot-spots (e.g., at coffee shops or other public locations). While having connectivity, the user terminal may upload and download information such as e-mails, social networking messages, etc. Another example is passengers onboard a train that may pass through multiple train stations with WiFi access points.

2. Train (B) A user may be onboard a train in which a WiFi service is provided to customers via a local Access Point (AP). This AP may use a wireless, 802.11-based backbone to connect to track-side infrastructure. A directional antenna may be used to provide continuous coverage along the tracks 3. Toll/Weight Station Drive By (C) A vehicle on a highway driving through a toll station or passing by a weight station may be able to connect to an AP at the toll station or weight station. While driving by (or being weighed) information such as billing the customer with tolls or exchange of freight information may be provided.

Enabling applications for these non-overlapping but related connections may rely upon a standard IP protocol suite and potentially trust in the underlying wireless technology to establish a secure link.

In some proposed systems for setup of Internet Protocol (IP) connections, after receiving a beacon, there may be 16 roundtrip exchanges (32 messages communicated to and from an access terminal) to establish a secure link for the access terminal.

In selected embodiments of proposed systems described herein, a fast link setup can be performed wherein the number of messages to setup an IP connection and secure link after receiving the beacon is reduced to 1 roundtrip exchange (2 messages) from the previous 16 roundtrip exchanges (32 messages). An Extensible Authentication Protocol/Re-authentication Protocol (EAP/ERP) may be used as part of the fast link setup.

FIG. 1 is a conceptual diagram illustrating an example of a wireless network configuration for communicating data between one or more terminals and an access point. The network configuration 100 of FIG. 1 may be used for communicating data between one or more terminals and an access point. The network configuration 100 includes an access point 102 coupled to a network 104. The access point 102 may be configured to provide wireless communications to various communication devices such as wireless devices (which may also be referred to herein as stations (STAs) and access terminals (ATs) 106, 108, 110). As a non-limiting example, the access point 102 may be a base station. As non-limiting examples, the stations/terminals 106, 108, 110 may be a personal computer (PC), a laptop computer, a tablet computer, a mobile phone, a personal digital assistant (PDA), and/or any device configured for wirelessly sending and/or receiving data, or any combination thereof. The network 104 may include a distributed computer network, such as a transmission control protocol/internet protocol (TCP/IP) network.

The access point 102 may be configured to provide a variety of wireless communications services, including but not limited to: Wireless Fidelity (WiFi) services, Worldwide Interoperability for Microwave Access (WiMAX) services, and wireless session initiation protocol (SIP) services. The stations/terminals 106, 108, 110 may be configured for wireless communications (including, but not limited to communications in compliance with the 802.11, 802.11-2007, and 802.11x family of specifications developed by the Institute of Electrical and Electronics Engineers (IEEE)). In addition, the stations/terminals 106, 108, 110 may be configured to send data to and receive data from the access point 102.

Figure 2:
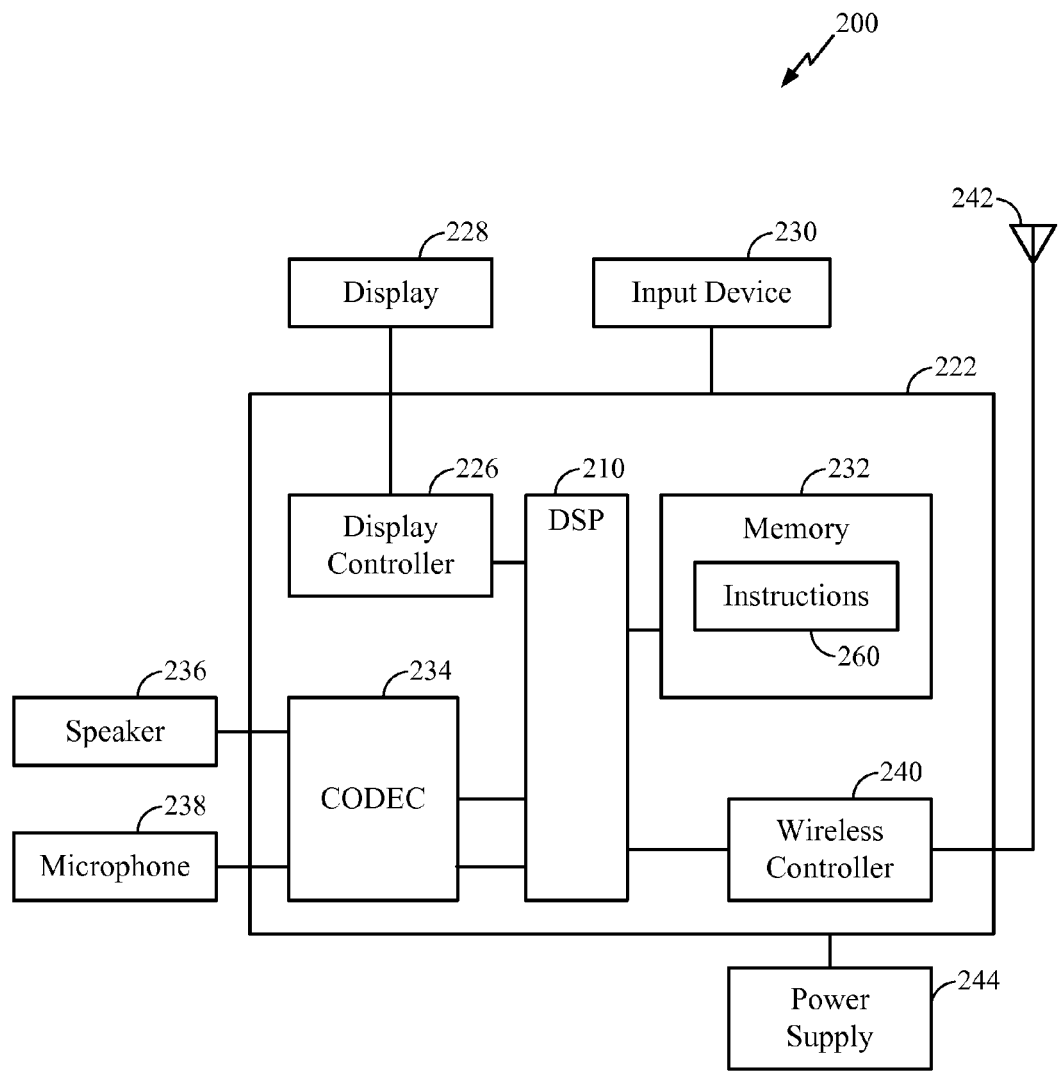
FIG. 2 is a block diagram illustrating an exemplary user device.

FIG. 2 is a block diagram illustrating an exemplary station/terminal 200. A processor 210 (e.g., a Digital Signal Processor (DSP)) is coupled to a memory 232 for storing information such as data for processing and transmission and instructions 260 for execution on the processor 210. The instructions may be executable by the processor 210 to perform various methods and functions of a station/terminal, as described herein. Moreover, an access point (AP), an authentication server (AS), and a Dynamic Host Configuration Protocol (DHCP) server may similarly include a processor and memory storing instructions executable by the processor to perform various methods and functions of an AP, AS, and DHCP server, respectively, as described herein.

A display controller 226 may be coupled to the processor 210 and to a display device 228. A coder/decoder (CODEC) 234 can also be coupled to the processor 210. As non-limiting examples of user interface devices, a speaker 236 and a microphone 238 may be coupled to the CODEC 234. A wireless controller 240 may be coupled to the processor 210 and to an antenna 242. In a particular example, the processor 210, the display controller 226, the memory 232, the CODEC 234, and the wireless controller 240 may be included in a system-in-package or system-on-chip device 222. In a particular example, an input device 230 and a power supply 244 may be coupled to the system-on-chip device 222. Moreover, in a particular example, as illustrated, the display device 228, the input device 230, the speaker 236, the microphone 238, the antenna 242, and the power supply 244 may be external to the system-on-chip device 222. However, each of the display device 228, the input device 230, the speaker 236, the microphone 238, the wireless antenna 242, and the power supply 244 can be coupled to a component of the system-on-chip device 222, such as an interface or a controller.

Figure 3:
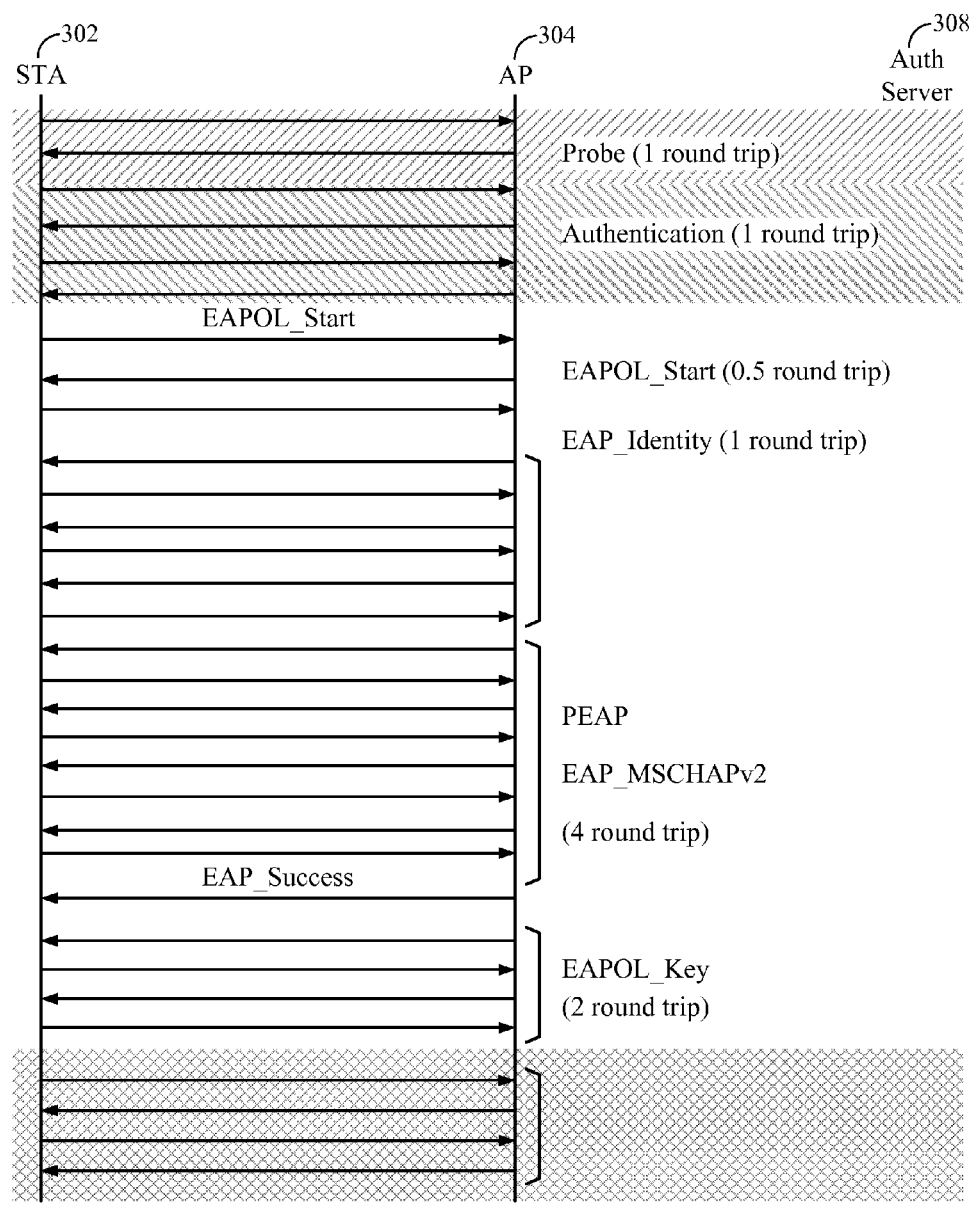
FIG. 3 is a flow diagram illustrating messaging that may be performed in a conventional connection setup.

FIG. 3 is a flow diagram illustrating messaging that may be performed in a conventional connection setup. The messages shown between the station/terminal 302 and the access point 304 may include a probe and authentication request. An Extensible Authentication Protocol (EAP) Over Local Area Network (LAN) (EAPOL) process may start and include an identification phase, a Protected EAP (PEAP) phase, and an EAP-Microsoft Challenge Handshake authentication Protocol (EAP-MSCHAPv2). Upon EAP success, an EAPOL key may be established. Thus, at least 16 messages must be communicated to or from the station/terminal 302 to establish the link setup and authentication.

In particular embodiments of the proposed system described herein, the number of messages to setup an IP connection (after receiving the beacon) is reduced to 2 messages (from 16 messages). Extensible Authentication Protocol Re-authentication Protocol (ERP) may be used as part of the re-authentication as described more fully below with respect to FIGS. 12 and 13 and may include the following optimizations. The station/terminal (STA) 302 may perform full EAP authentication once, and keeps using ERP fast re-authentication for fast initial link setup thereafter.

A re-authentication Master Session Key (rMSK) is generated by the station/terminal 302 prior to sending an association request without obtaining a challenge from the network. A pairwise transient key (PTK) is generated by the station (STA) 302 from the rMSK and includes a key confirmation key (KCK), a key encryption key (KEK), and a Transient Key (TK).

The association request is sent by the station 302 and bundles an EAP reauthorization request with a Dynamic Host Configuration Protocol (DHCP)-Discover-with-Rapid-Commit and a SNonce (e.g., SNonce is picked up by the STA 302, i.e., station nonce). The bundled message may be included as one or more information elements (IEs). The EAP reauthorization request is authenticated by the authentication server (Auth Server) 308 using a re-authentication integrity key (rIK). The DHCP-Discover-with-Rapid-Commit and SNonce are protected using the re-authentication Master Session Key (rMSK) or pairwise transient key (PTK) derived from the rMSK. The DHCP-Discover-with-Rapid-Commit may be encrypted and MIC'd (Message Integrity Code) or not encrypted but MIC'd. While some of the examples herein may utilize a discover request (e.g., Discover-with-Rapid-Commit) to illustrate an efficient re-authentication concept, it should be understood that any message used at an upper layer (of a protocol stack) to assign IP address may be used instead.

If the DHCP Message is encrypted, the access point 304 may hold the DHCP-Discover-with-Rapid-Commit & SNonce messages until the EAP-re-authentication request is validated by the authentication server 308. To validate the message, access point (AP) 304 waits until it receives an rMSK from the Authentication server 308 and derives the pairwise transient key (PTK). Based on the rMSK obtained from authentication server 308, the access point 304 derives the PTK which is used for MIC (Message Integrity Code) as well as to decrypt the message.

If the DHCP Message is not encrypted, the access point 304 may forward the DHCP-Discover-with-Rapid-Commit to a DHCP-Server with the expectation that majority of the cases the message came from a correct device (but retain the SNonce messages until the EAP re-authentication request is validated by the authentication server 308). Even though the DHCP-Discover-with-Rapid-Commit may be sent to the DHCP-Server, the access point 304 will hold a DHCP-Acknowledge until it verifies the DHCP Discover message based on the rMSK obtained from the authentication server 308 and the access point 304 derives the PTK.

The access point (AP) 304 then sends the DHCP-Acknowledge+a GTK/IGTK protected with the PTK. In other words, the DHCP-Acknowledge is encrypted and message integrity is protected.

A non-limiting aspect may include the one or more of the following steps in a process for link setup and authentication.

First, a user may obtain a station/terminal 302 and perform a full EAP authentication as part of an initial setup with a specific network (e.g., a specific WiFi network). As a non-limiting example, perhaps the full EAP authentication may be maintained for a specific authentication period, such as, for example, one year.

Second, during the authentication period, the user passes by (several, non-overlapping) publicly accessible WiFi hotspots (e.g. at coffee shops and other public places). In other words, this step may be performed multiple times and with multiple access points 304 that are part of the setup network during the authentication period. The station/terminal 302 will perform a Fast Initial Link Setup (FILS) with the network using ERP. Bundling of the ERP with the DHCP-Rapid-Discovery using the association request message will reduce the signaling for the association request to one roundtrip as explained more fully below. During the authentication period, the user's station/terminal 302 may continue to perform ERP for Fast Initial Link Setup (FILS) when connecting with the network.

Third, as expiration of the authentication period approaches, the user may be warned to perform a "full attachment" to the network again, within a given period of time (for example, 2 weeks). During this period, the user will continue to be able to use fast-authentication based on earlier full-EAP authentication until it expires, or a full attachment is performed. The full attachment notification may originate from the network or may be configured locally on the station/terminal 302.

Fourth, if the user doesn't perform full attachment, after one year, the network will fail ERP, and will initiate full EAP authentication for another year as outlined in step 1.

FIGS. 4-11 illustrate various different scenarios for performing the two message link setup and authentication.

Figure 4:
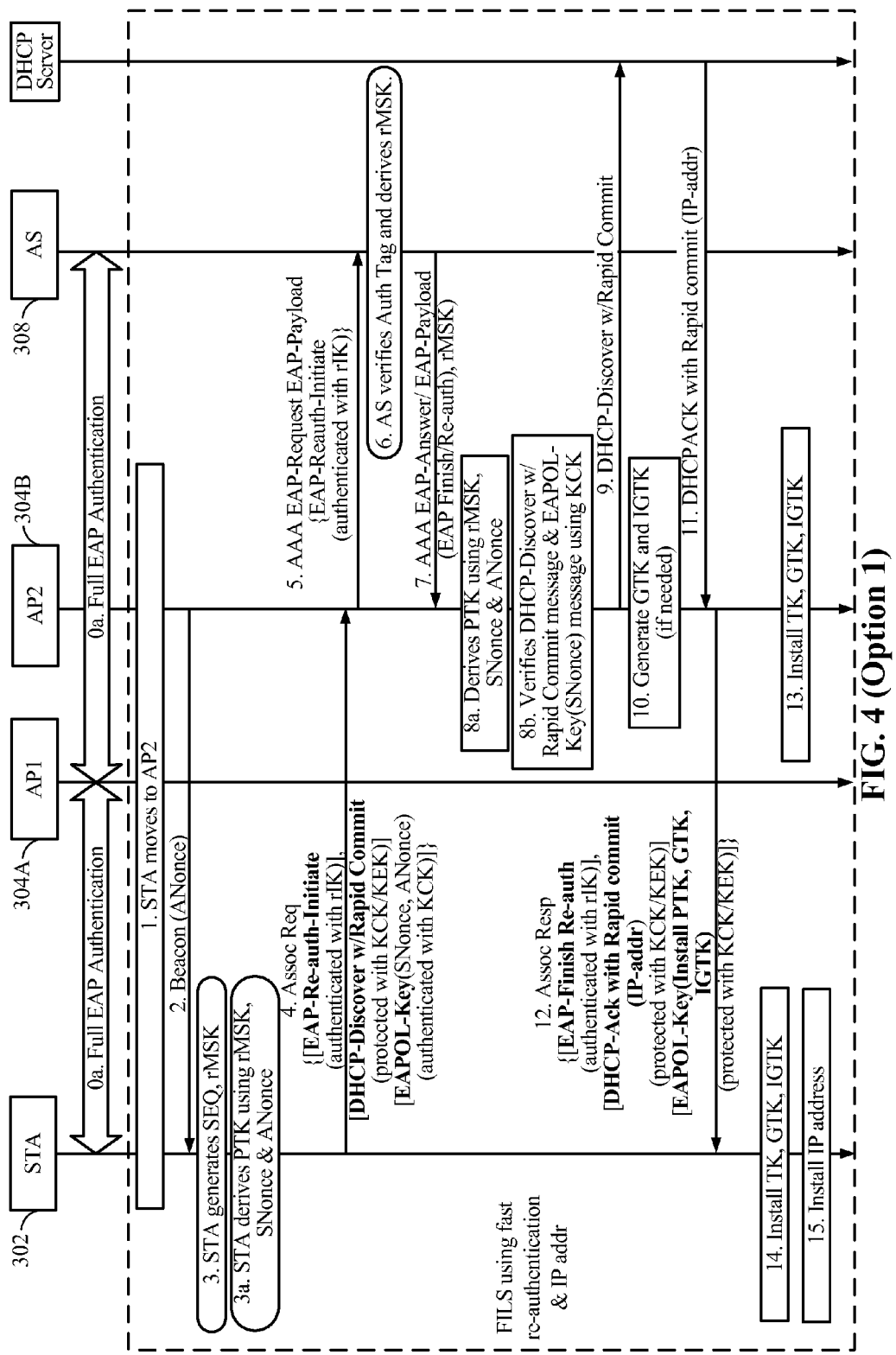
FIG. 4 is a flow diagram illustrating messaging that may be performed according to one or more aspects of the present disclosure.

FIG. 4 is a flow diagram illustrating a first example of performing efficient link setup and authentication for a client station. At steps 0a and 0b, while communicatively coupled to a first access point AP1 304A, the station/terminal (STA) 302 may perform full EAP authentication. Upon moving (step 1) closer to a second access point AP2 304B, and detecting its beacon (step 2), the station/terminal 302 may seek to re-authenticate itself via the second access point AP2 304B. In this process, the access point 304B transmits a beacon/probe which includes a capability indicator for Fast Initial Link Setup (FILS). The capability indicator may indicate the ability to handle an association request with the bundled ERP and DHCP-Rapid-Discovery. In step 3, the station/terminal 302 generates a re-authentication master session keys (rMSK) (see FIG. 13) using ERP before sending the association request, where:

rMSK=KDF (K, S);
K=rRK; and
S=rMSK label|"\0"|SEQ| length.

The station/terminal 302 packs the one or more messages as information elements (IEs) (or parameters/payload) of an association request (Step 3). For example, such association request may include: 1) EAP re-authentication initiate (Message Integrity using rIK); 2) DHCP Discover with Rapid Commit (Encrypted & Message integrity using KCK/KEK); and/or 3) EAPOL-Key (SNonce, ANonce) (Message integrity using KCK). The EAPOL-Key may be configured as an entire frame or subset. The ANonce (i.e., access point nonce) may be selected by the station/terminal 302 and sent to the access point AP2 304B. The access point (AP2) 304B can ensure that the station/terminal 302 is using an ANonce sent in the past several seconds/milliseconds (e.g., a recent ANonce obtained from the beacon for the AP2), for example. The access point AP2 304B holds the DHCP & EAPOL-Key message until it receives a root Master Session Key (rMSK) from the authentication server 308. The access point AP2 304B generates a PTK from the rMSK. The access point AP2 304B performs a Message Integrity Code (MIC) exchange for the DHCP & EAPOL Key messages and decrypts the DHCP. The access point AP2 304B uses the rMSK to derive KCK/KEK to protect a DHCP-acknowledge and an EAPOL Key message before sending to the station/terminal 302.

In various examples, the ANonce may be sent by the AP2 304B either using the beacon to allow stations that use passive scanning, or in a Probe Response message when active scanning is used. When the ANonce is sent by the AP2 304B using the beacon, the ANonce may be changed in every beacon, or a multiple of beacons. The station 302 may include the ANonce picked by the station 302 in the Association Request message sent from the station 302 to AP2 304B.

Figure 5:
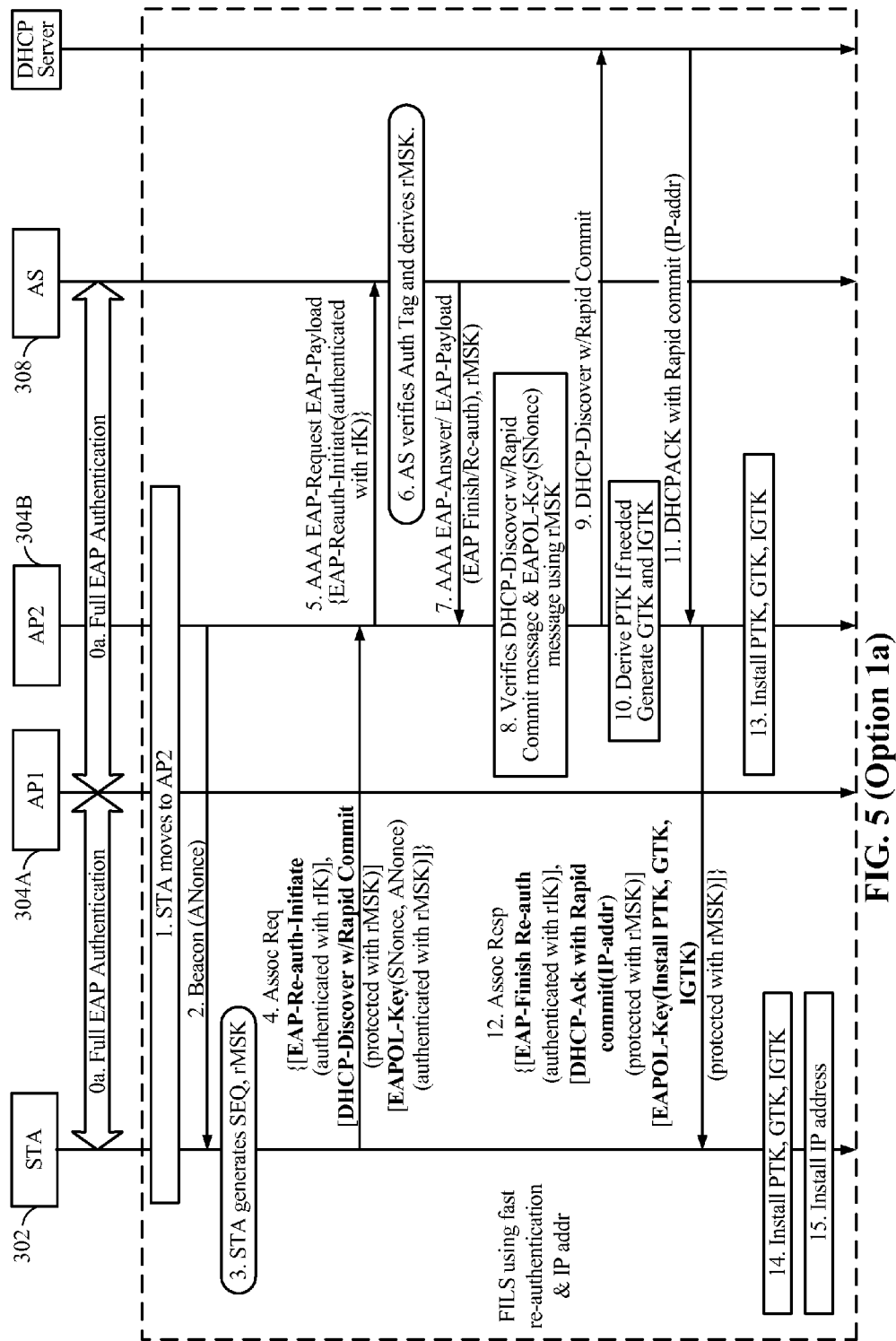
FIG. 5 is a flow diagram illustrating messaging that may be performed in performing link setup and authentication.

FIG. 5 is a flow diagram illustrating messaging that may be performed according to other aspects of link setup and authentication. This process may be referred to as Option 1a. The processes performed in FIG. 5 are similar to those performed in FIG. 4 (Option 1) except that the rMSK is used (instead of the KCK/KEK of the PTK) to authenticate the DHCP-Discover and EAPOL-Key messages encapsulated in the association request message.

Figure 6:
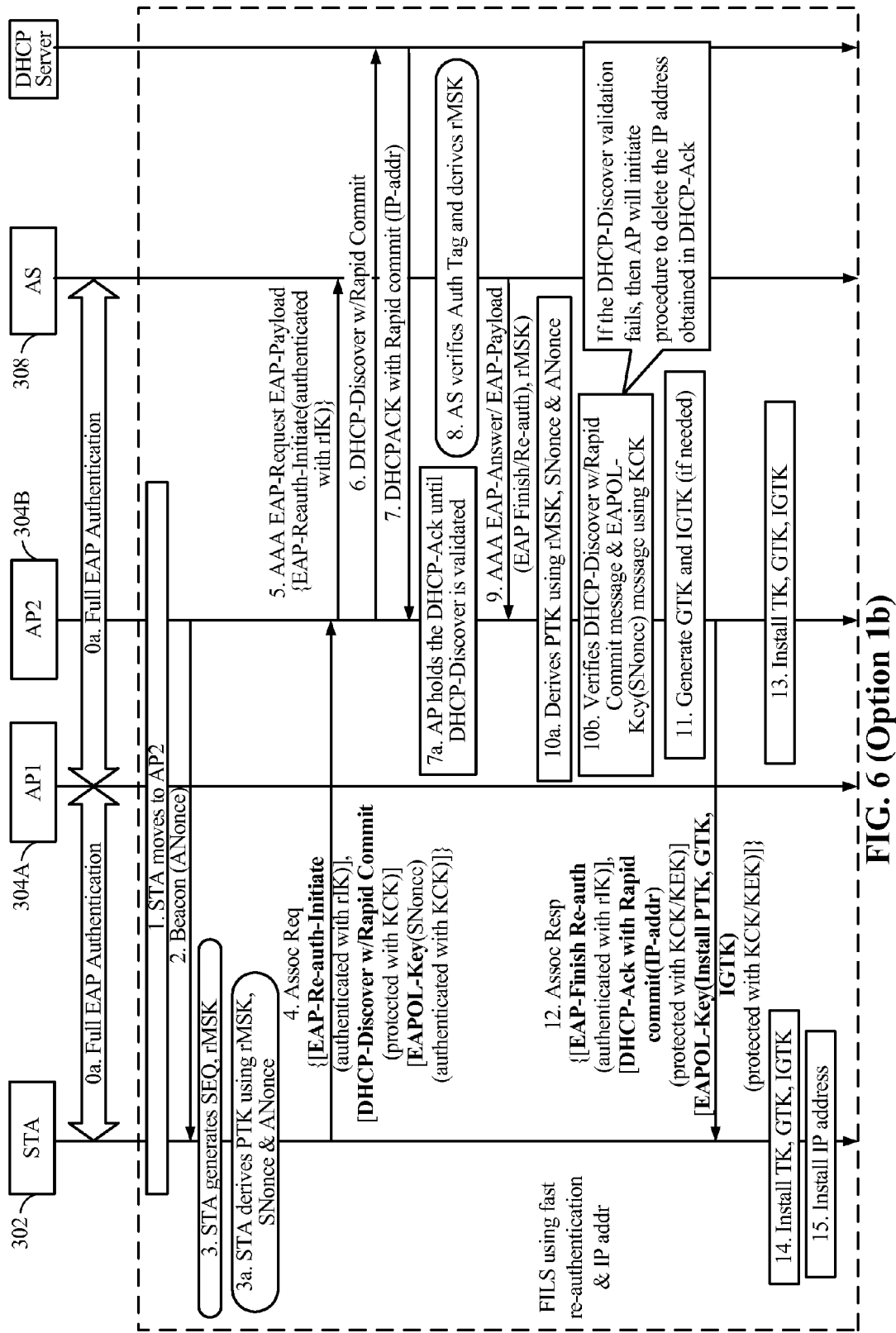
FIG. 6 is a flow diagram illustrating messaging that may be performed according to other aspects of link setup and authentication.

FIG. 6 is a flow diagram illustrating messaging that may be performed according to other aspects of link setup and authentication. This process may be referred to as Option 1b. The processes performed in FIG. 6 are similar to those performed in FIG. 4 (Option 1) except for the following possible differences. In step 2 shown on FIG. 6, the access point 304 may advertise a capability that the DHCP-request can be encrypted. In step 4 shown on FIG. 6, the station/terminal 302 may decide if the DHCP message should be encrypted or not. Several factors may be taken into consideration by the station/terminal 302, such as, for example, if the DHCP-discover request contains any private information, etc. If the station/terminal decides to encrypt the DHCP-discover request, then the access point 304 may hold the message (as shown in FIGS. 4 and 5).

If the station/terminal decides not to encrypt the DHCP-discover request, following steps may be performed. In step 4 shown on FIG. 6, the DHCP-Discover request information element (IE) or parameter is only Message-Integrity protected. Based on step 4, the access point 304 sends the DHCP-Discover-With-Rapid-Commit (step 6) without waiting for a response for an EAP re-authenticate-initiate request (step 9). This process causes the IP address assignment to take place in parallel with the EAP re-authentication procedure. In step 7a shown on FIG. 6, the access point holds the DHCP-acknowledge that came from the DHCP server until step 10b, where the DHCP-Discover is validated. If the message integrity fails, then the access point 304 initiates a procedure to delete the IP address assigned using the DHCP-acknowledge.

Figure 7:
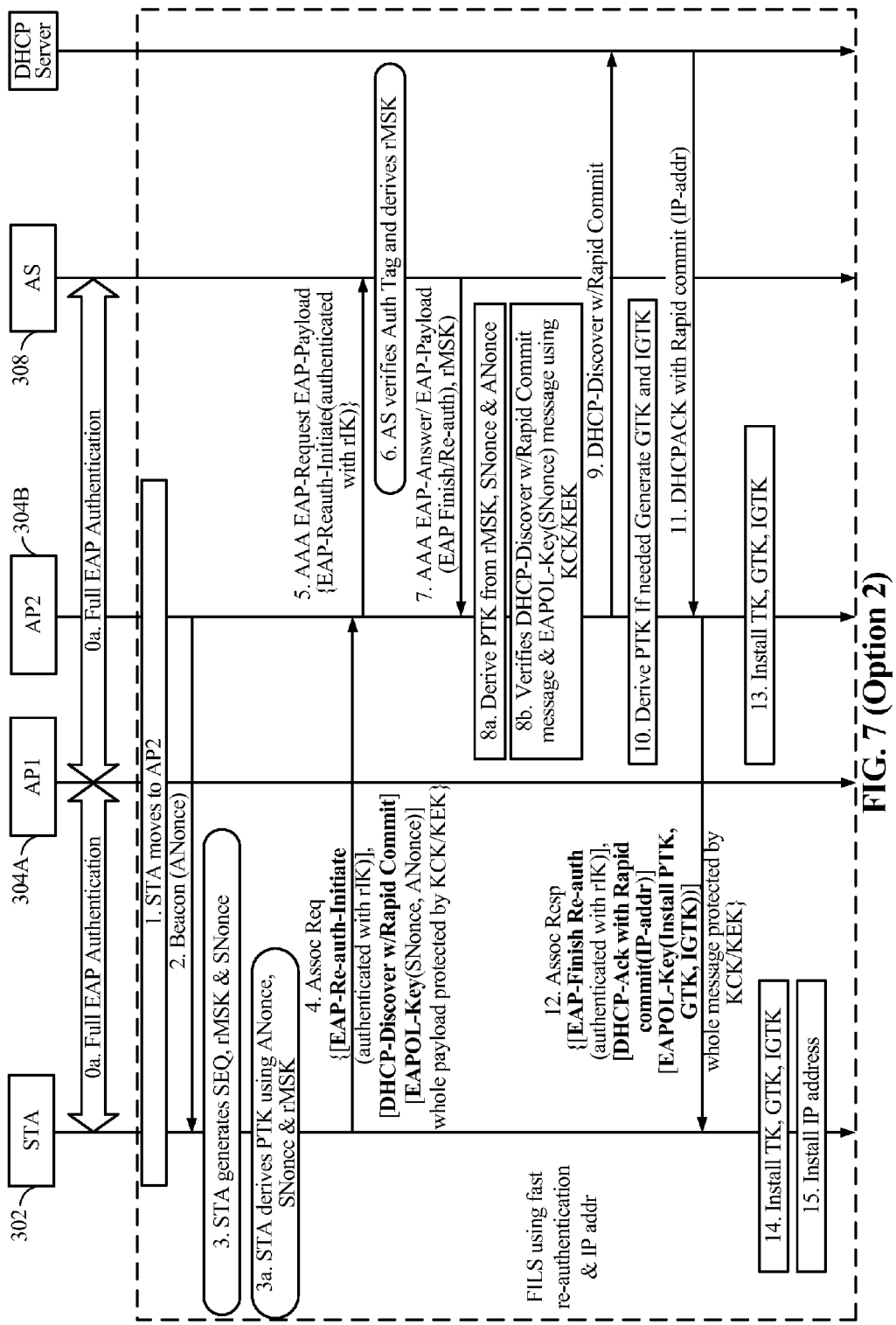
FIG. 7 is a flow diagram illustrating messaging that may be performed according to other aspects of link setup and authentication.

FIG. 7 is a flow diagram illustrating messaging that may be performed according to other aspects of link setup and authentication. This process may be referred to as Option 2. The processes performed in FIG. 7 are similar to those performed in FIG. 4 (Option 1) except for the following possible differences. Instead of authenticating the DHCP message and the EAPOL-Key message independently, the combined payload that includes the EAP re-authentication, the DHCP-Discover and the EAPOL-Key may be authenticated using KCK/KEK. The access point 304 extracts the EAP re-authentication-initiate message and forwards it to the authentication server 308 without validating the entire message, which was authenticated using KCK/KEK. The access point 304 authenticates the entire message after it receives the rMSK from the authentication server 308.

Figure 8:
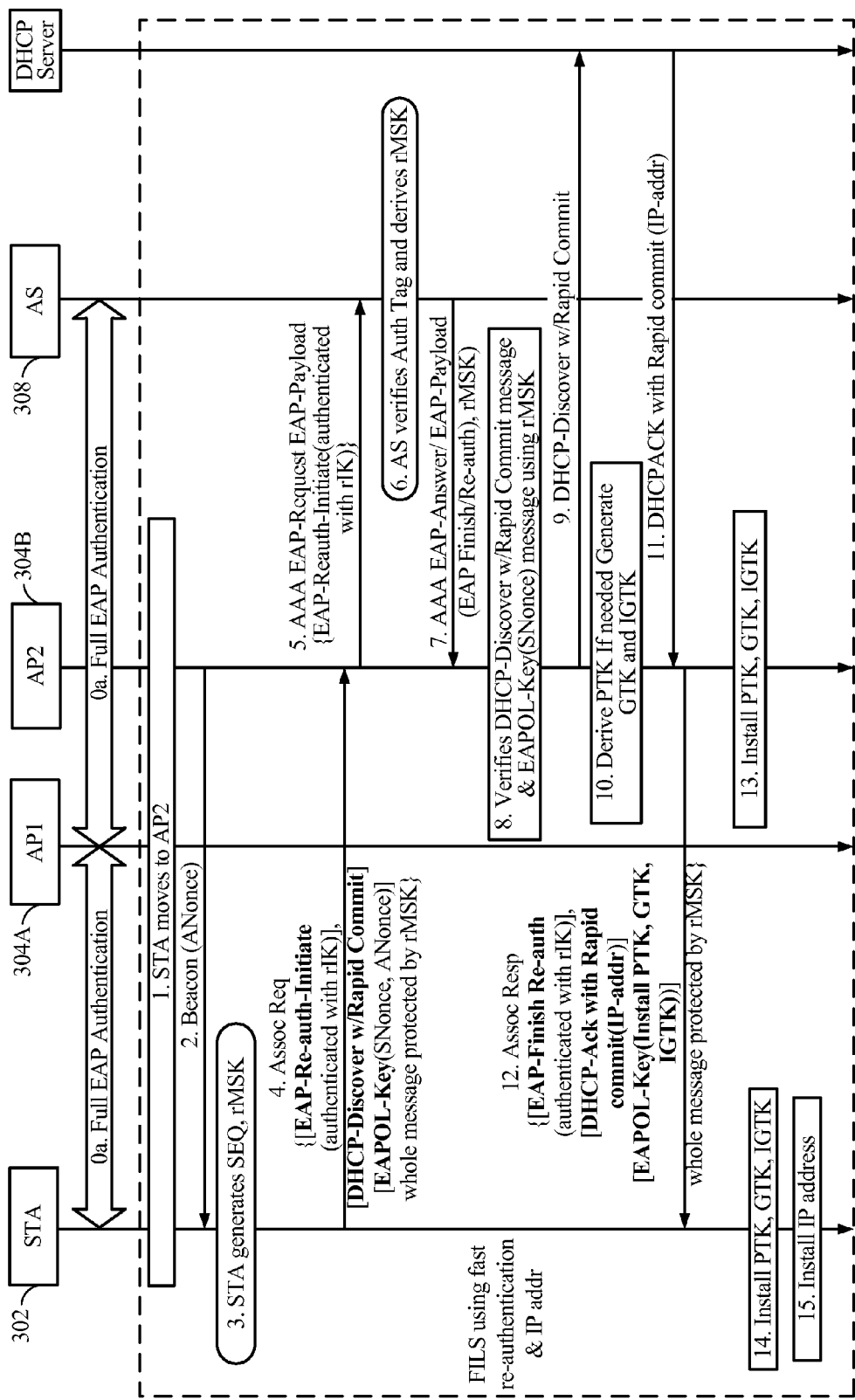
FIG. 8 is a flow diagram illustrating messaging that may be performed according to other aspects of link setup and authentication.

FIG. 8 is a flow diagram illustrating messaging that may be performed according to other aspects of link setup and authentication. This process may be referred to as Option 2a. The processes performed in FIG. 8 are similar to those performed in FIG. 5 (Option 1a) except for the following possible differences. Instead of authenticating the DHCP message and the EAPOL-Key message independently, the combined payload that includes the EAP re-authentication, the DHCP-Discover and the EAPOL-Key may be authenticated using the rMSK. The access point 304 extracts the EAP re-authentication-initiate message and forwards it to the authentication server 308 without validating the entire message, which was authenticated using rMSK. The access point 304 authenticates the entire message after it receives the rMSK from the authentication server 308. The DHCP discover message (step 9) may be sent before step 5. In this case, the IP address assigned is ignored if the authentication is not successful.

Figure 9:
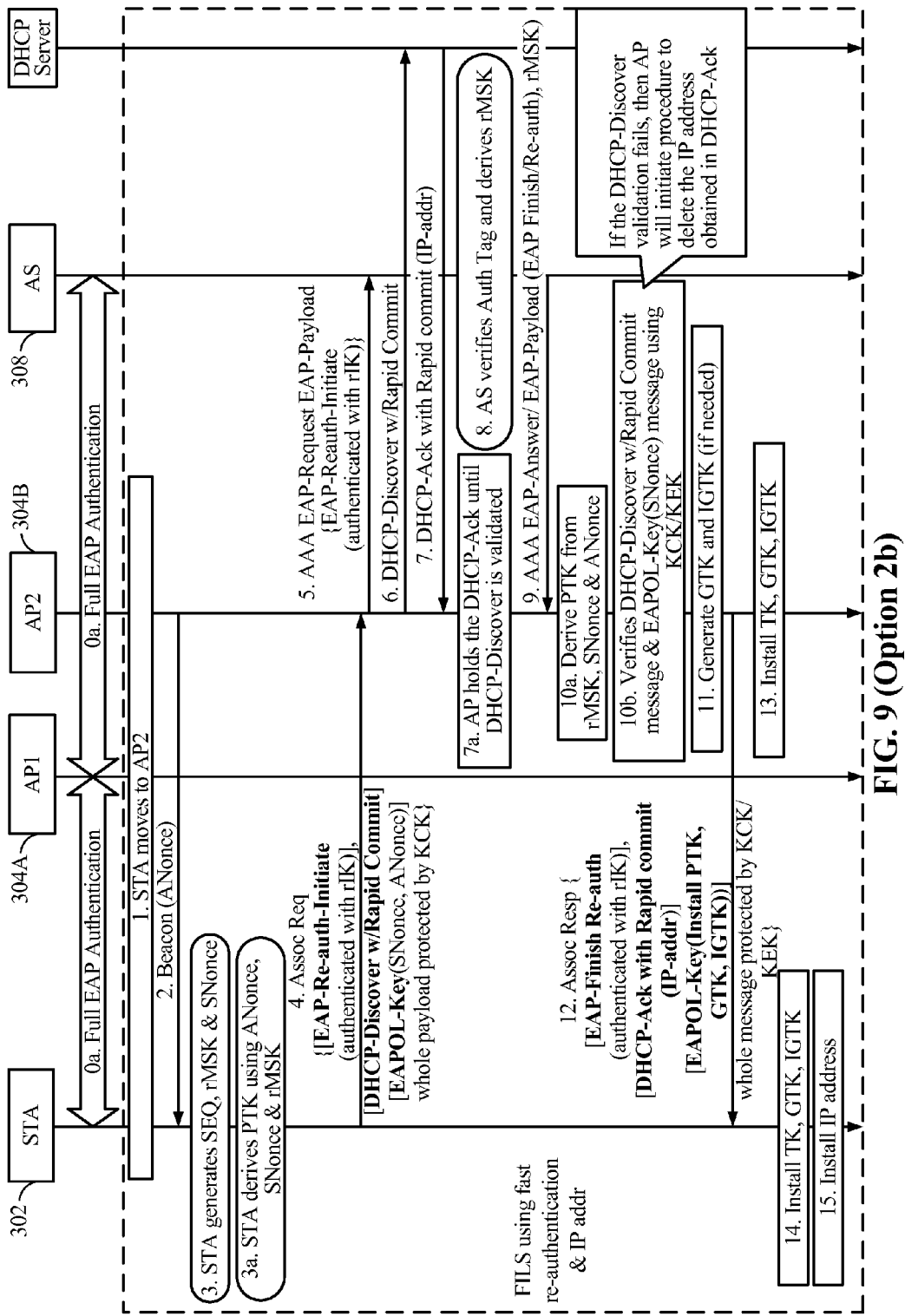
FIG. 9 is a flow diagram illustrating messaging that may be performed according to other aspects of link setup and authentication.

FIG. 9 is a flow diagram illustrating messaging that may be performed according to other aspects of link setup and authentication. This process may be referred to as Option 2b. The processes performed in FIG. 9 are similar to those performed in FIG. 4 except for the following possible differences. In step 2, the access point may advertise the capability that the DHCP-request can be encrypted. In step 4, the station/terminal 302 decides if the DHCP message should be encrypted or not. Several factors may be taken into consideration by the station/terminal 302, such as, for example, if the DHCP-discover request contains any private information etc. If the station/terminal 302 decides to encrypt the DHCP-discover request, then the access point 304 will hold the message as described above in option 2 and option 2a. If the station/terminal 302 decides not to encrypt the DHCP-discover request, then the following steps may be performed. In step 4, the DHCP-discover message IE is only message-integrity protected. Based on step 4, the access point 304 sends the DHCP-Discover-With-Rapid-Commit (step 6) without waiting for response for the EAP Re-authentication-Initiate-Request (step 9). This process causes the IP address assignment to take place in parallel with the EAP re-authentication procedure. In step 7a, the access point 304 holds the DHCP-acknowledge that came from the DHCP server until step 10b, where the DHCP-discover is validated. If the message integrity fails, then the access point 304 initiates a procedure to delete the IP address assigned using the DHCP-acknowledge message.

Figure 10:
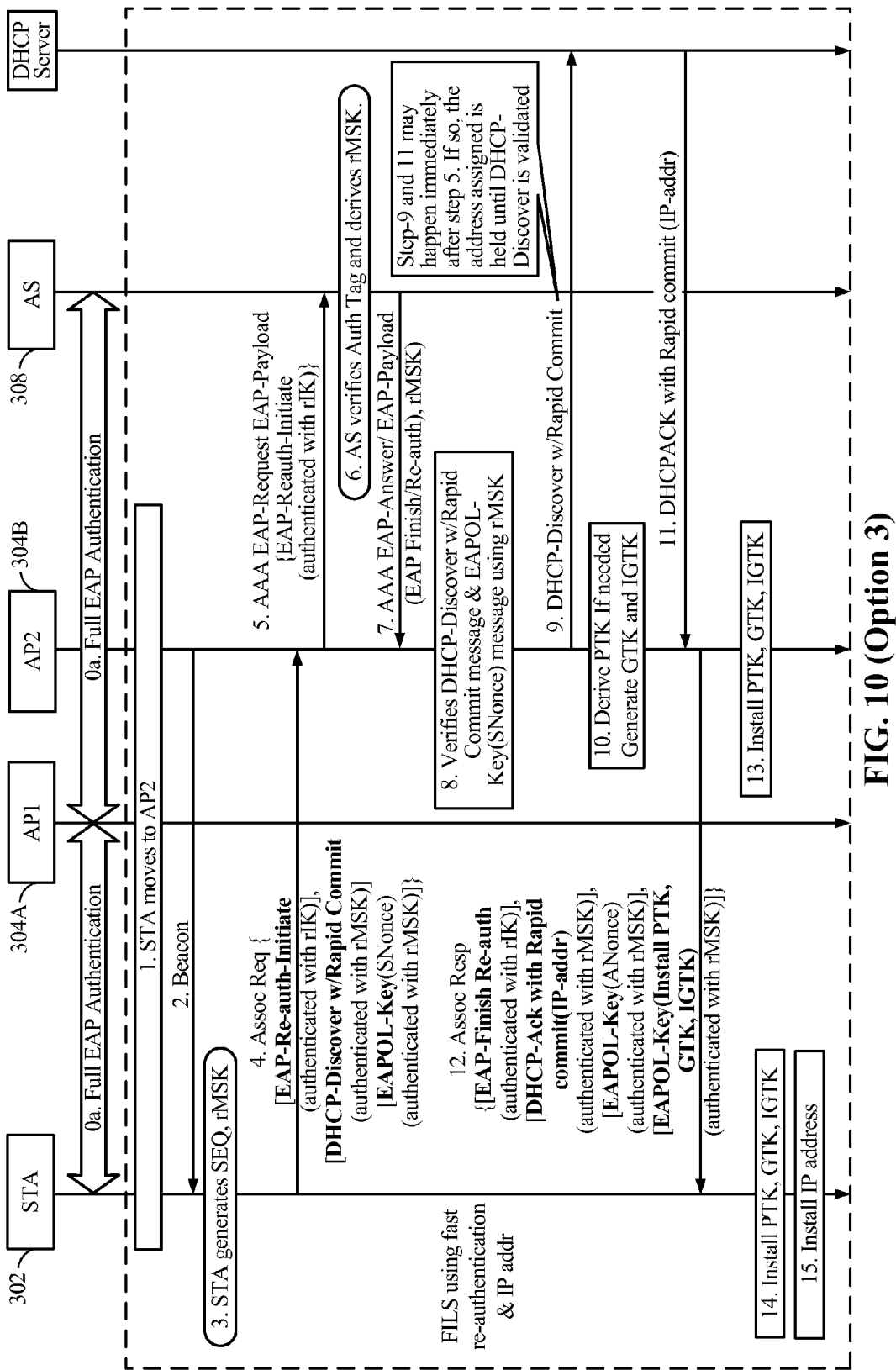
FIG. 10 is a flow diagram illustrating messaging that may be performed according to other aspects of link setup and authentication.

FIG. 10 is a flow diagram illustrating messaging that may be performed according to other aspects of link setup and authentication. This process may be referred to as Option 3. The processes performed in FIG. 10 are similar to those performed in FIGS. 4 and 5 (Options 1 and 1a) except for the following possible differences. The ANonce may be sent in the association response along with an "Install PTK, GTK, IGTK" message. Steps 9 and 11 in FIG. 10 may be performed in parallel with steps 5-7 as described in option b and option 2b.

An option 4 may also be derived from options 1 and 2 except for the following possible differences. Instead of a single message at step 4 (i.e., the association request), the association request may be split as message 1 (M1), which encapsulates the DHCP-discover message and message 2 (M2), which encapsulates the EAP re-authentication-initiate message and the SNonce. The access point 304 will not act on the DHCP-discover message until it receives the EAPOL-Key. The two messages (M1 & M2) may be separated by a SIFS period. This option 4 may have an advantage that the EAPOL structure can be re-used.

Figure 11:
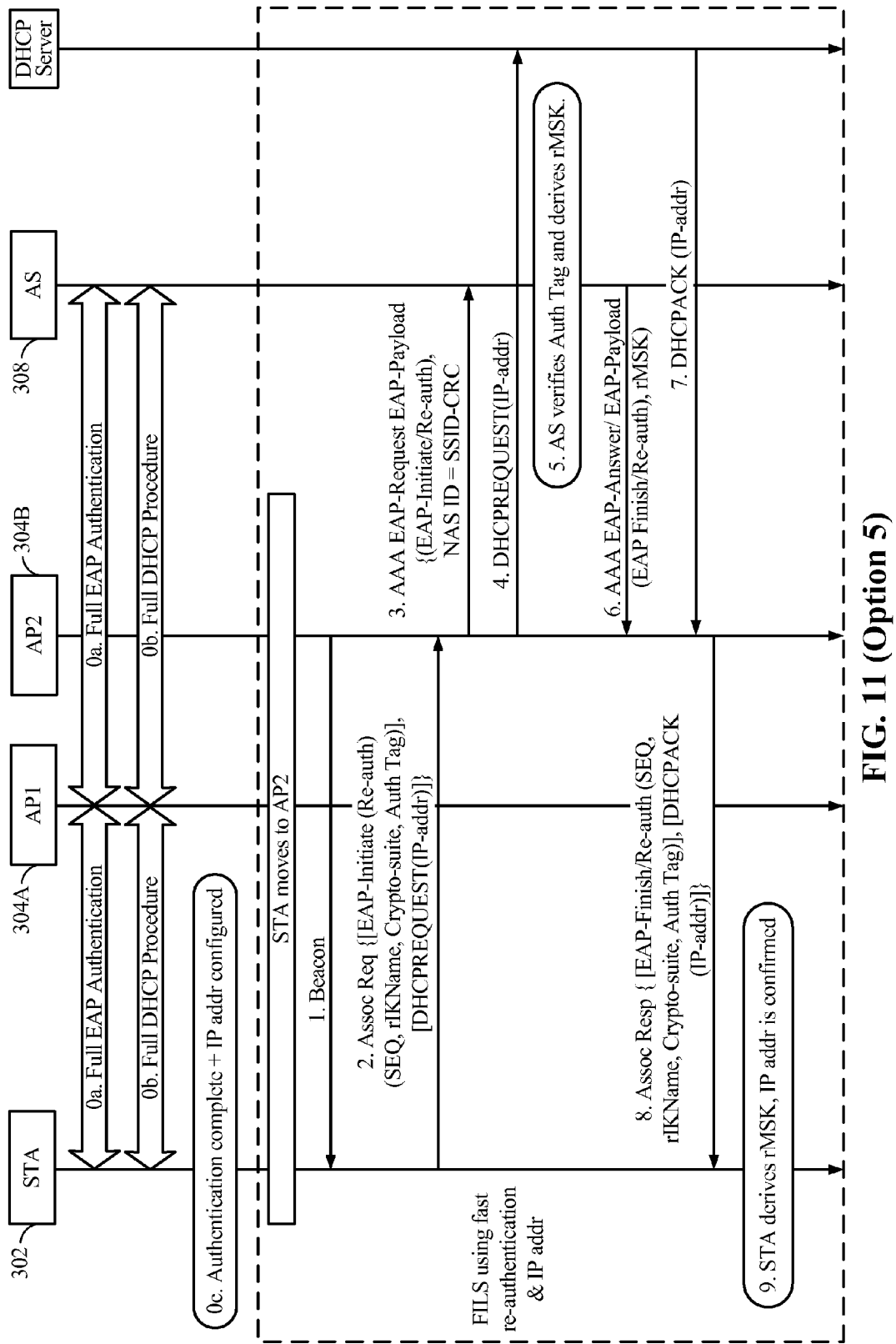
FIG. 11 is a flow diagram illustrating messaging that may be performed according to other aspects of link setup and authentication.

FIG. 11 is a flow diagram illustrating messaging that may be performed according to other aspects of link setup and authentication. This process may be referred to as Option 5. The processes performed in FIG. 11 are similar to those performed in FIG. 4 (Option 1) except for the following possible differences. The access point 304 transmits the Beacon/Probe response, which includes the Fast Initial Link Setup (FILS) capability indicator for concurrent ERP and/or IP address assignment. In this scenario, the lease timer of the IP address assigned by the access point 304 is not expired. The station/terminal 302 uses the IP address assigned by a first access point 304A in a DHCP request sent to a second access point 304 to confirm if it can continue to use that IP address. If the IP address has expired, then the DHCP server 306 sends a DHCP-NAK.

Figure 12:
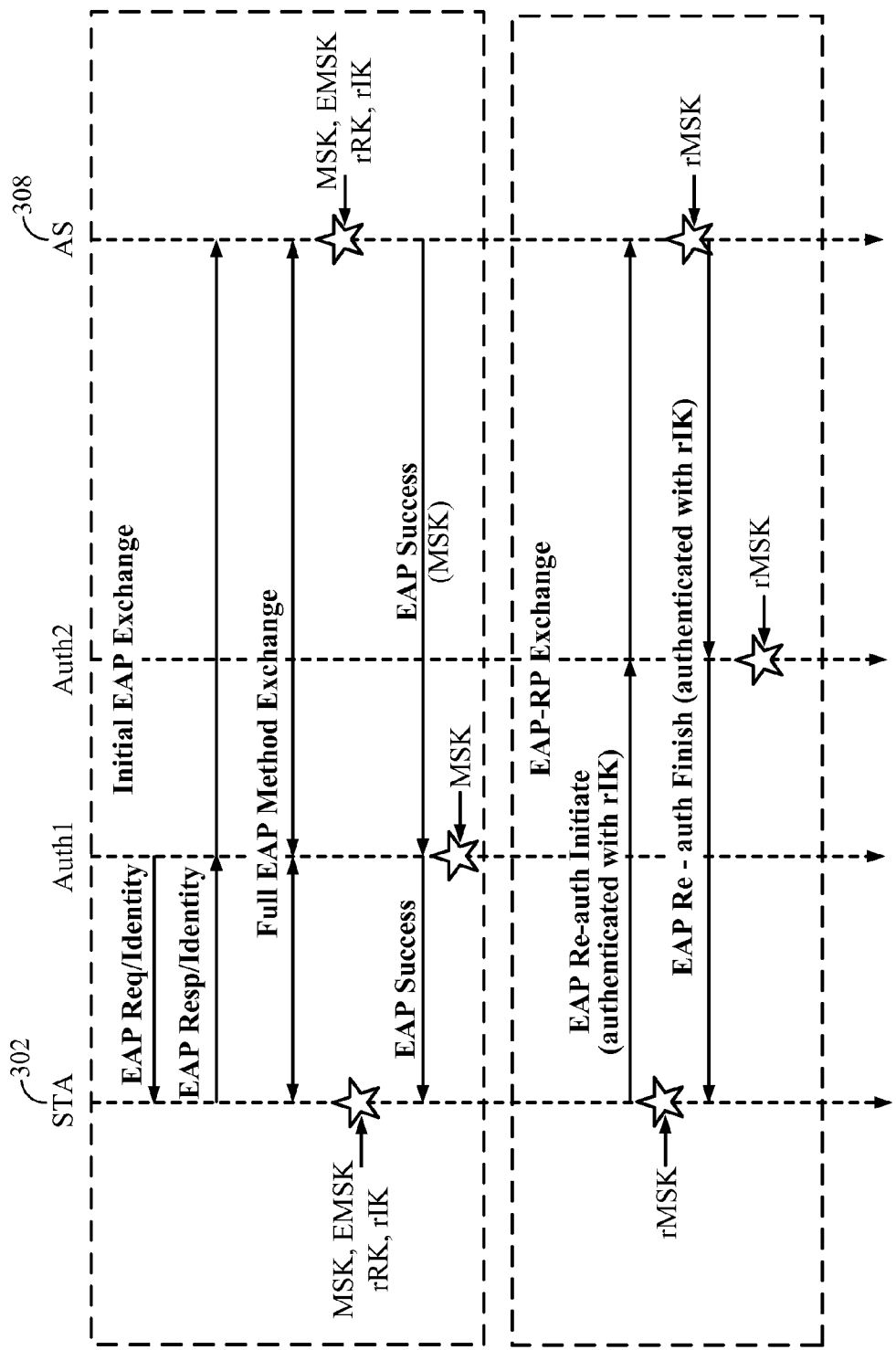
FIG. 12 is a flow diagram illustrating messaging that may be performed during a re-authentication protocol.

FIG. 12 is a flow diagram illustrating messaging that may be performed during a re-authentication protocol. The first time the station/terminal 302 attaches to a network, it performs a full EAP exchange with the authentication server 308. As a result, a master session key (MSK) is distributed to the EAP authenticator. The master session key (MSK) is then used by the authenticator and the station/terminal 302 to establish transient session keys (TSKs) as needed. At the time of the initial EAP exchange, the station/terminal 302 and the authentication server 308 also derive an EMSK, which is used to derive a re-authentication Root Key (rRK). More specifically, a re-authentication Root Key (rRK) may be derived from the extended MSK (EMSK) or from a Domain-Specific Root Key (DSRK), which itself is derived from the EMSK. The re-authentication Root Key (rRK) may be only available to the station/terminal 302 and the authentication server 308 and is generally not distributed to any other entity. Further, a re-authentication Integrity Key (rIK) may be derived from the re-authentication Root Key (rRK). The station/terminal 302 and the authentication server 308 may use the re-authentication integrity key (rIK) to provide proof of possession while performing an ERP exchange. The re-authentication integrity key (rIK) is also generally not handed out to any other entity and is generally only available to the station/terminal 302 and the authentication server 308.

Two new EAP codes, EAP-Initiate and EAP-Finish, are defined for the purpose of EAP re-authentication. When the station/terminal 302 requests and ERP it performs the ERP exchange shown in the bottom box of FIG. 12.

Figure 13:
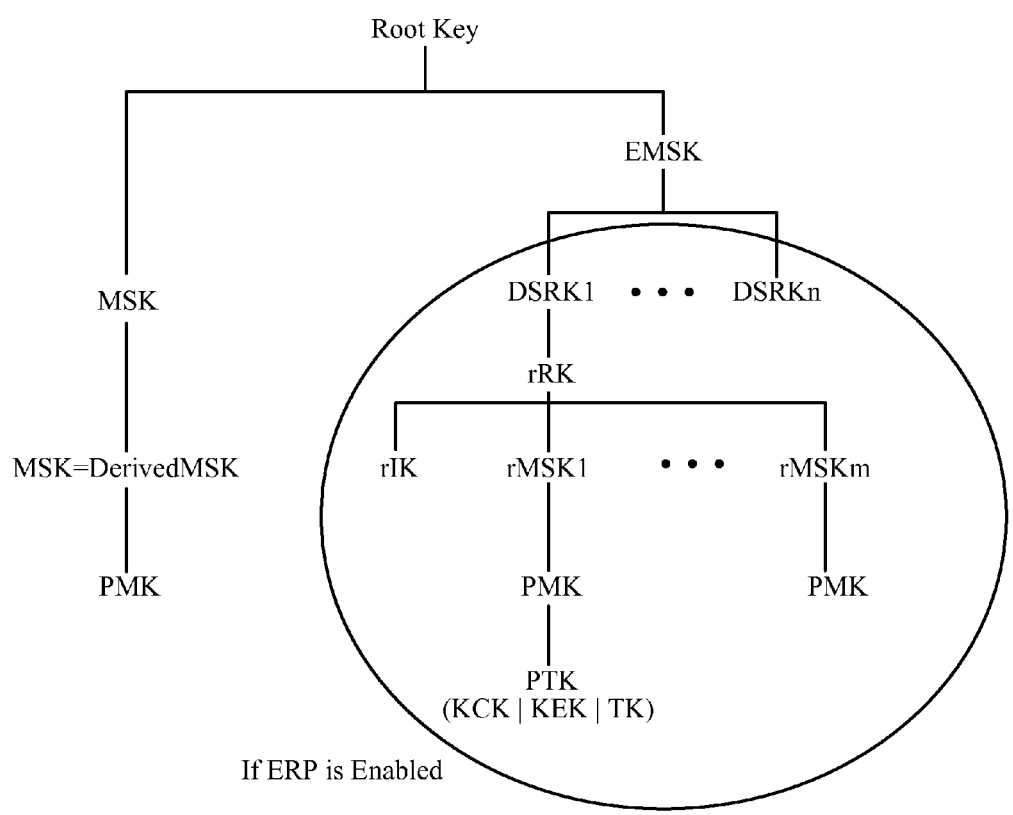
FIG. 13 illustrates a key hierarchy that may be used for a re-authentication protocol.

FIG. 13 illustrates a key hierarchy that may be used for a re-authentication protocol. The master session key (MSK) may be derived from a root key and a pairwise master key (PMK) may be derived from the master session key (MSK). The extended MSK (EMSK) may be derived from the root key. For the ERP exchange, various additional keys may be derived from the extended MSK (EMSK). DSRK1-DSRKn may be derived. Each of the Domain-Specific Root Key (DSRK) keys may include the rRK. From the re-authentication root key (rRK), the re-authentication integrity key (rIK) and re-authentication master session keys (rMSK1 . . . rMSKn) may be derived. Each of the rMSKs may include a pairwise master key (PMK). A pairwise transient key (PTK) (which may include a key confirmation key (KCK), a key encryption key (KEK), and a transient key (TK)) may be derived from the PMK.

Figure 14:
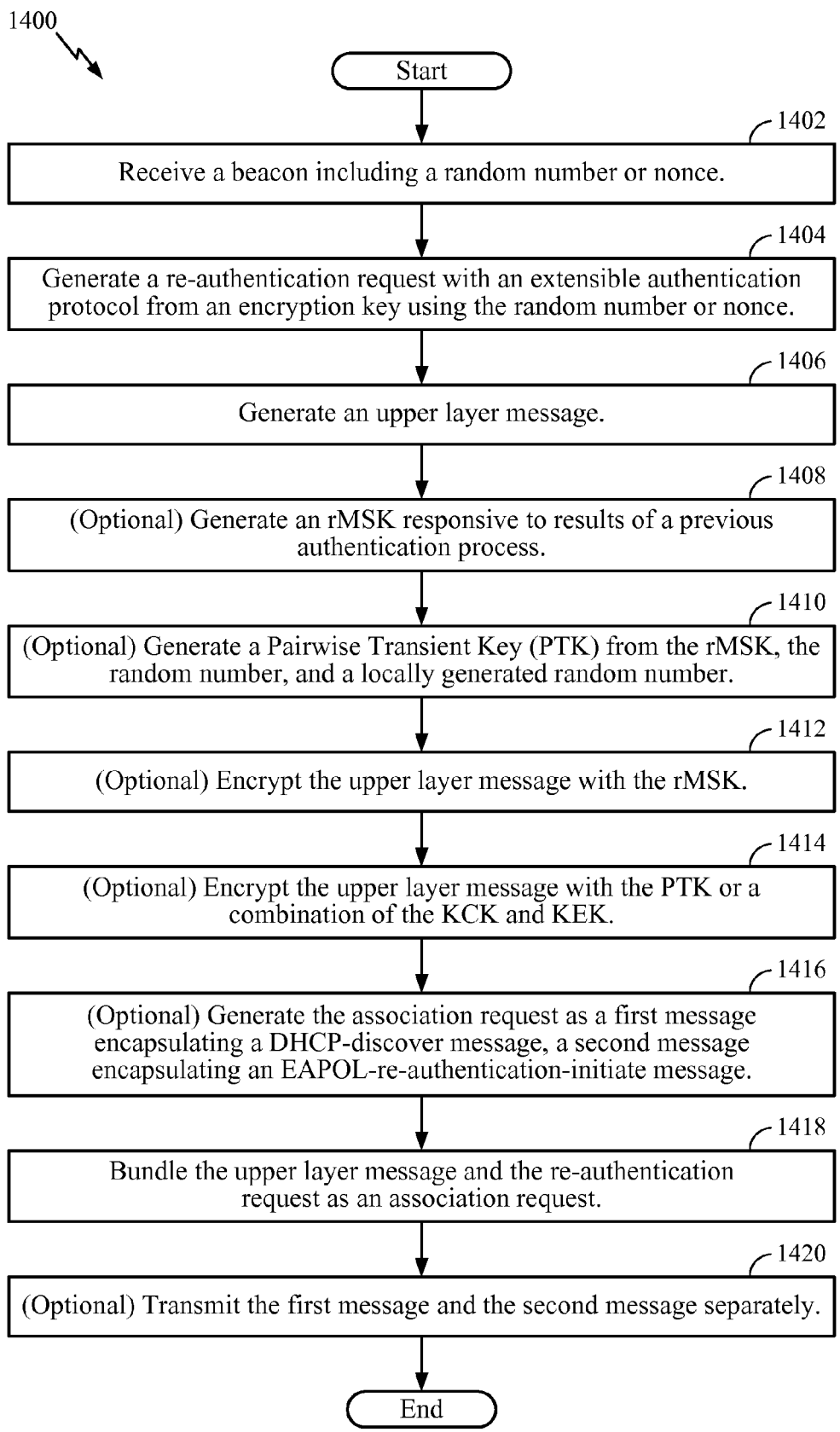
FIG. 14 is a flow diagram showing an exemplary process to generate and bundle a re-authentication request and a discover request into an association request.

FIG. 14 is a flow diagram showing an exemplary process 1400 operational at a station/terminal to generate and bundle a re-authentication request and an upper layer message (e.g., discover request) into an association request. Operation block 1402 indicates that a beacon including a random number or nonce (e.g., ANonce) is received from the access point. At operation block 1404, the terminal generates a re-authentication request with an extensible authentication protocol from an encryption key using the random number or nonce. At operation block 1406, the terminal generates an upper layer message. For example, such upper layer message may be a discover request, a dynamic host configuration protocol (DHCP) discover-with-rapid-commit request, and/or internet protocol (IP) address assignment message.

Operation block 1408 indicates that in some aspects the terminal may generate a re-authentication master session key (rMSK) responsive to results of a previous authentication process. Operation block 1410 indicates that in some aspects the terminal may generate a Pairwise Transient Key (PTK) from the rMSK, the random number (ANonce), and/or a locally generated random number (SNonce).

Operation block 1412 indicates that in some aspects the terminal may encrypt the upper layer message with the rMSK. Operation block 1414 indicates that in some aspects the terminal may encrypt the upper layer message with the PTK or a combination of the KCK and KEK. In other aspects, the upper layer message may be unencrypted.

Operation block 1416 indicates that in some aspects the terminal may generate the association request as a first message encapsulating a DHCP-discover message, a second message encapsulating an EAPOL-re-authentication-initiate message.

Operation block 1418 indicates that the terminal bundles the upper layer message and the re-authentication request as an association request. Operation block 1420 indicates that in some aspects the terminal may transmit the first message and the second message separately.

Figure 15:
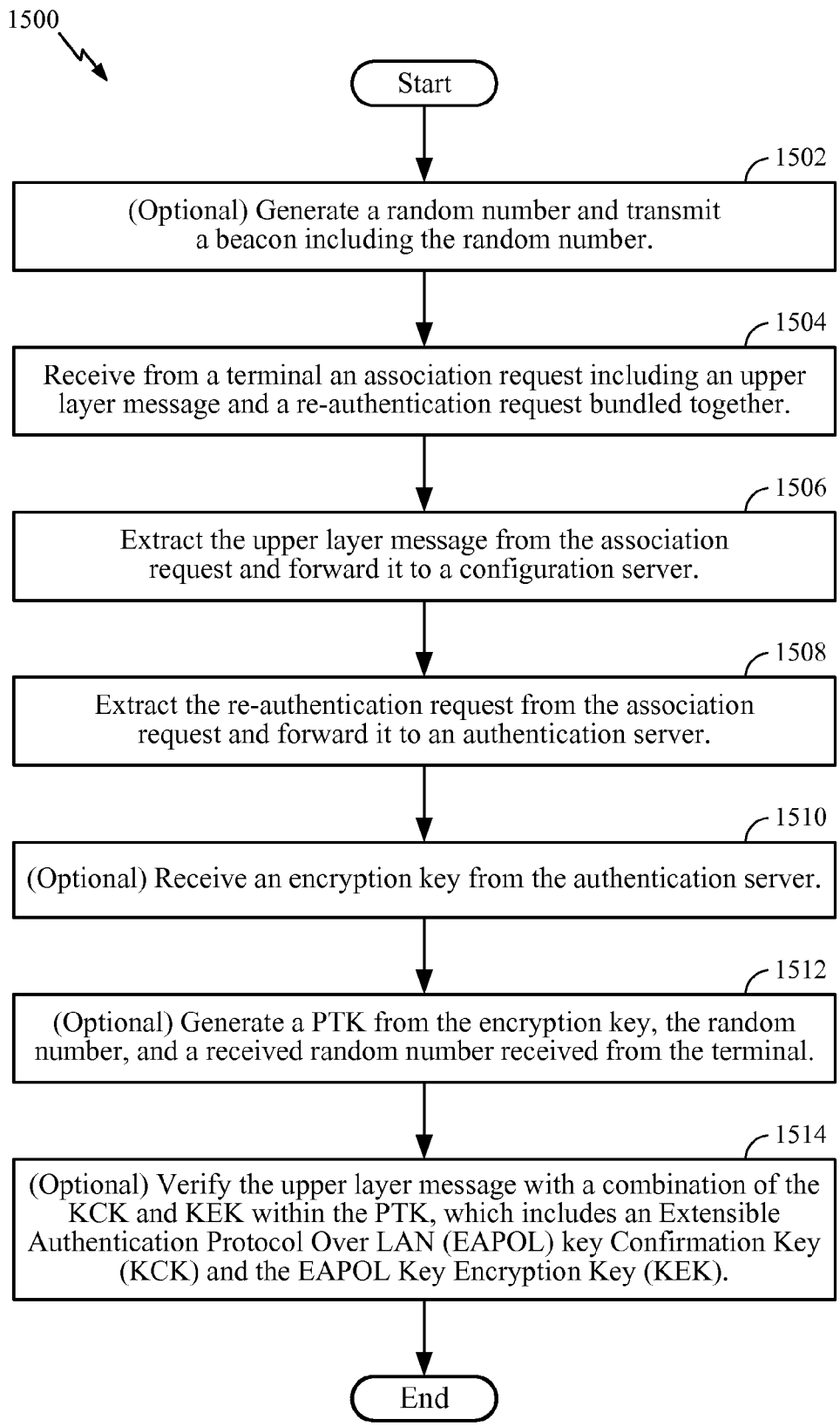
FIG. 15 is a flow diagram showing an exemplary process operational at a base station to receive and extract a re-authentication request and an upper layer message from an association request sent by a station/terminal.

FIG. 15 is a flow diagram showing an exemplary process 1500 operational at a base station to receive and extract a re-authentication request and an upper layer message from an association request sent by a station/terminal Operation block 1502 indicates that in some aspects the access point may generate a random number and transmit a beacon including the random number.

Operation block 1504 indicates that the access point receives from a terminal an association request including an upper layer message (e.g., discover request) and a re-authentication request bundled together. Operation block 1506 indicates that the access point extracts the upper layer message from the association request and forwards it to a configuration server. Operation block 1508 indicates that the access point extracts the re-authentication request from the association request and forwards it to an authentication server.

Operation block 1510 indicates that in some aspects the access point may receive an encryption key from the authentication server. Operation block 1512 indicates that in some aspects the access point may generate a PTK from the encryption key, the random number, and a received random number received from the terminal. Operation block 1514 indicates that in some aspects the access point may verify the upper layer message with a combination of the KCK and KEK within the PTK, which includes an Extensible Authentication Protocol Over LAN (EAPOL) key Confirmation Key (KCK) and the EAPOL Key Encryption Key (KEK).

It will be noted that particular embodiments described with reference to FIGS. 4-15 may involve a 4-way handshake for fast initial link setup. Generally, the 4-way handshake may include: 1) The AP sending an ANonce to the STA, 2) the STA sending a SNonce to the AP, 3) the AP sending a PTK to the STA, and 4) the STA confirming completion of the handshake.

Thus, the first part of the 4-way handshake may involve an STA listening for a beacon or soliciting a probe response from an access point prior to initiating link setup with the access point. For example, the beacon or probe response may include the ANonce that will be used by the STA for encryption and/or message integrity purposes. However, listening for a beacon may consume time, and soliciting a probe response may consume time and power. Thus, time and power at the STA may be conserved by enabling the STA to perform link setup without first listening for a beacon or soliciting a probe response from the access point.

Figure 16:
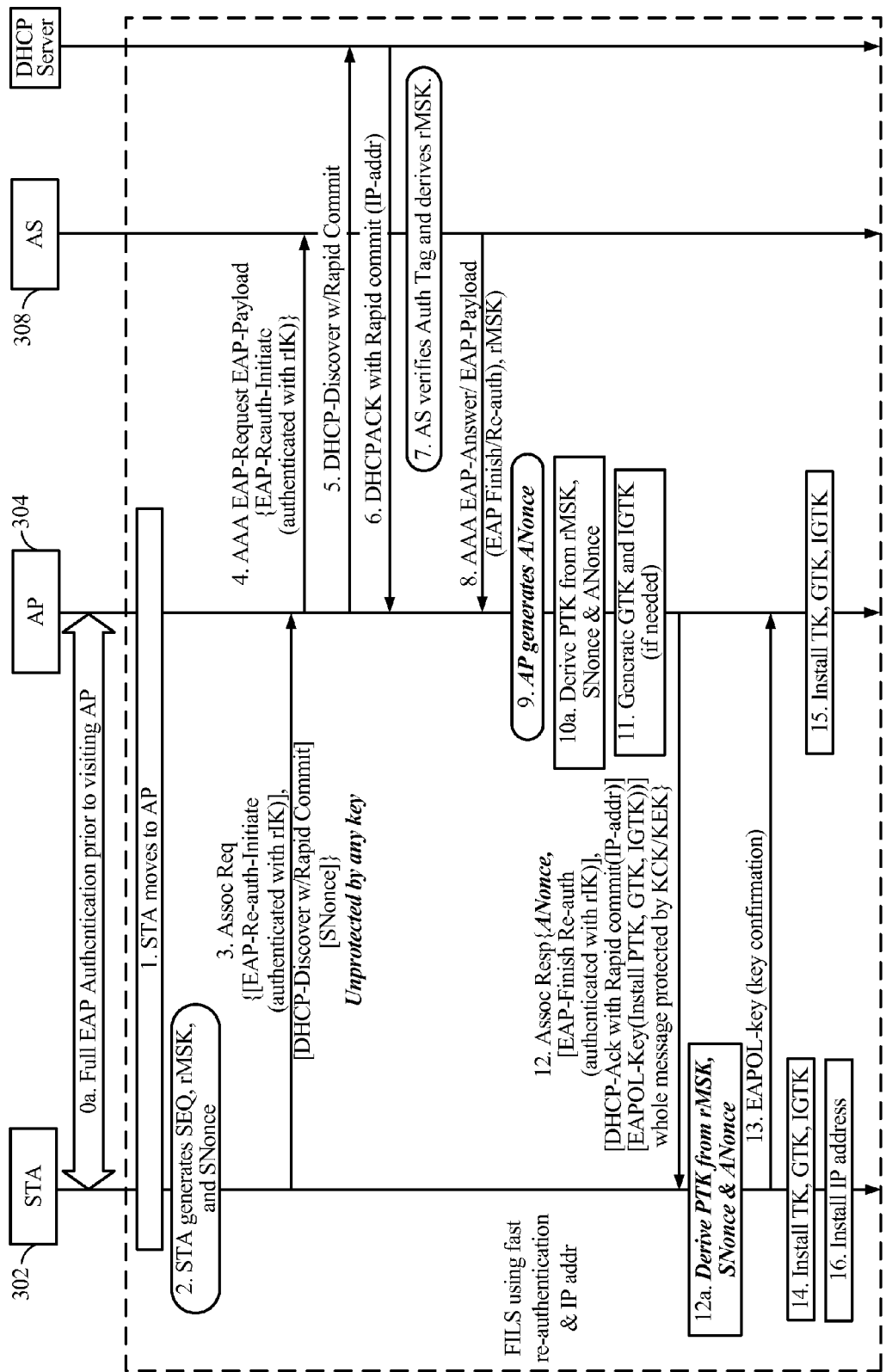
FIG. 16 is a flow diagram illustrating messaging that may be performed according to other aspects of link setup and authentication.

FIG. 16 is a flow diagram illustrating messaging that may be performed according to other aspects of link setup and authentication. In particular, FIG. 16 illustrates a modified 4-way handshake that enables link setup without first listening for a beacon or soliciting a probe response from an access point.

Selected messages and operations illustrated in FIG. 16 may correspond to messages and operations illustrated in FIGS. 4-11, with the following modifications. The STA 302 may generate an rMSK and a SNonce, at step 2, and send an unprotected association request to the AP 304, at step 3. The unprotected association request may include the SNonce. In contrast to the embodiment of FIG. 4, the STA 302 may perform these operations prior to receiving the ANonce and deriving the PTK. Because the STA 302 sends the association request before receiving the ANonce and deriving the PTK, the AP 304 may extract and forward the EAP re-authentication initiate portion of the association request to the AS 308, as indicated at step 4, without performing ANonce verification as described in FIG. 4. Instead, the AP 304 may rely on the AS 308 transmitting an answer message with a derived rMSK (step 7) as authentication for the STA 302.

After receiving the rMSK, the AP 304 may generate the ANonce, at step 9, and derive the PTK based on the ANonce, the rMSK, and the SNonce, at step 10a. Thus, the PTK may be derived at the AP 304 prior to being derived at the STA 302. The AP 304 may send an association response including the ANonce to the STA 302, at step 12, where the association response is protected using the KCK and KEK of the PTK. After receiving the association response from the AP 304, the STA 302 may generate the PTK using the rMSK, the SNonce, and the ANonce in the association response, at step 12a.

The association response sent from the AP 304 (which includes the ANonce), is integrity-protected using the ANonce. Information elements other than the ANonce in the association response may also be encrypted. Thus, the AP 304 may "pre-protect" (i.e., pre-encrypt/pre-integrity-protect) the association response using a PTK generated at the AP 304 using the SNonce obtained from the STA 302 in the association request, a rMSK obtained from the AS 308, and the locally generated ANonce that has not yet been transmitted to the STA 302. Upon receiving the association response, the STA 302 extracts the ANonce from the association response, generates the PTK, and verifies the integrity protection of the message. Thus, the STA 302 "post-validates" the message based on a key obtained from the message. Such pre-protection and post-validation may enable faster link setup than conventional handshake schemes that first confirm keys and then protect data using the keys.

The embodiment of FIG. 16 may thus enable the STA 302 to perform a modified 4-way handshake for link setup without first listening for a beacon or soliciting a probe response. This may reduce link setup time and conserve power at the STA 302. It should be noted that because the STA 302 does not wait for a beacon/probe response, the STA 302 may use an alternative addressing mechanism for the unprotected association request. For example, when the AP 304 is "known" to the STA 302, the STA 302 may have previously stored a basic service set identifier (BSSID) of the AP 304 in a memory of the STA 302. To initiate link setup, the STA 302 may retrieve the stored BSSID and may send the unprotected association request to the AP 304 based on the BSSID. Situations in which the AP 304 may be "known" to the STA 302 include when the AP 304 has previously been visited by the STA 302 (e.g., a "home" AP or an "office" AP), and when the STA 302 has not moved recently (e.g., as determined by a cellular and/or global positioning system (GPS) capability of the STA 302). Thus, in a particular embodiment, the STA 302 may send the association request responsive to location information determined at the STA 302 (e.g., when the STA 302 "knows" that the target AP 304 is in the vicinity of the STA 302).

Figure 17:
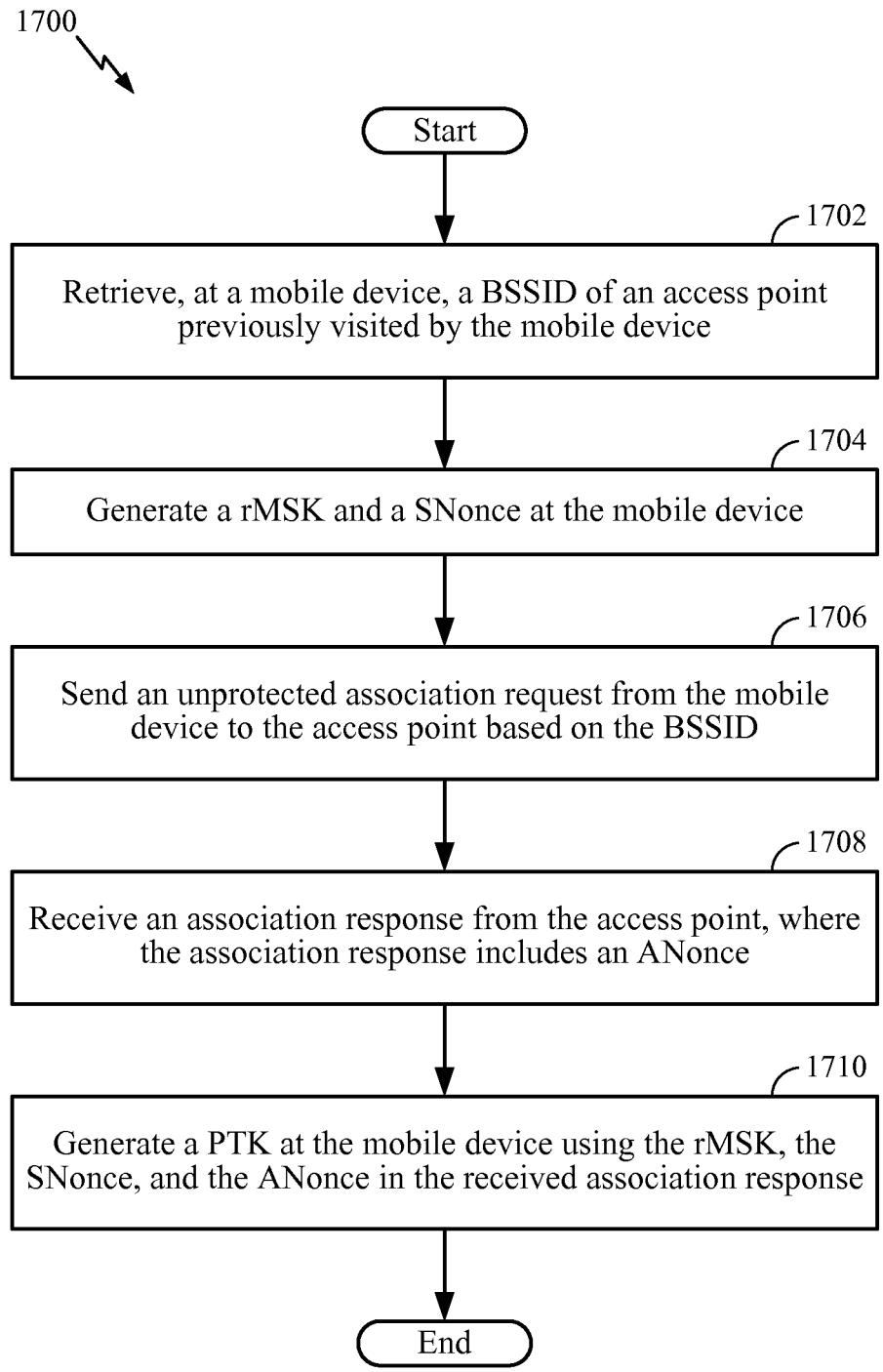
FIG. 17 is a flow diagram showing an exemplary process operable at the station of FIG. 16 to perform link setup and authentication.

FIG. 17 is a flow diagram showing an exemplary process 1700 operable at the STA 302 of FIG. 16 to perform link setup and authentication. At 1702, a mobile device (e.g., the STA 302) may retrieve a BSSID of an access point previously visited by the mobile device. Proceeding to 1704, the mobile device may generate a rMSK and a SNonce. Advancing to 1706, the mobile device may send an unprotected association request to the access point based on the BSSID. For example, referring to FIG. 16, the STA 302 may send the unprotected association request to the AP 304 at step 3.

Continuing to 1708, the mobile device may receive an association response from the access point, where the association response includes an ANonce. At 1710, the mobile device may generate a PTK using the rMSK, the SNonce, and the ANonce in the received association response. For example, referring to FIG. 16, the STA 302 may receive the association response from the AP 304 at step 12 and may derive the PTK at step 12a.

Figure 18:
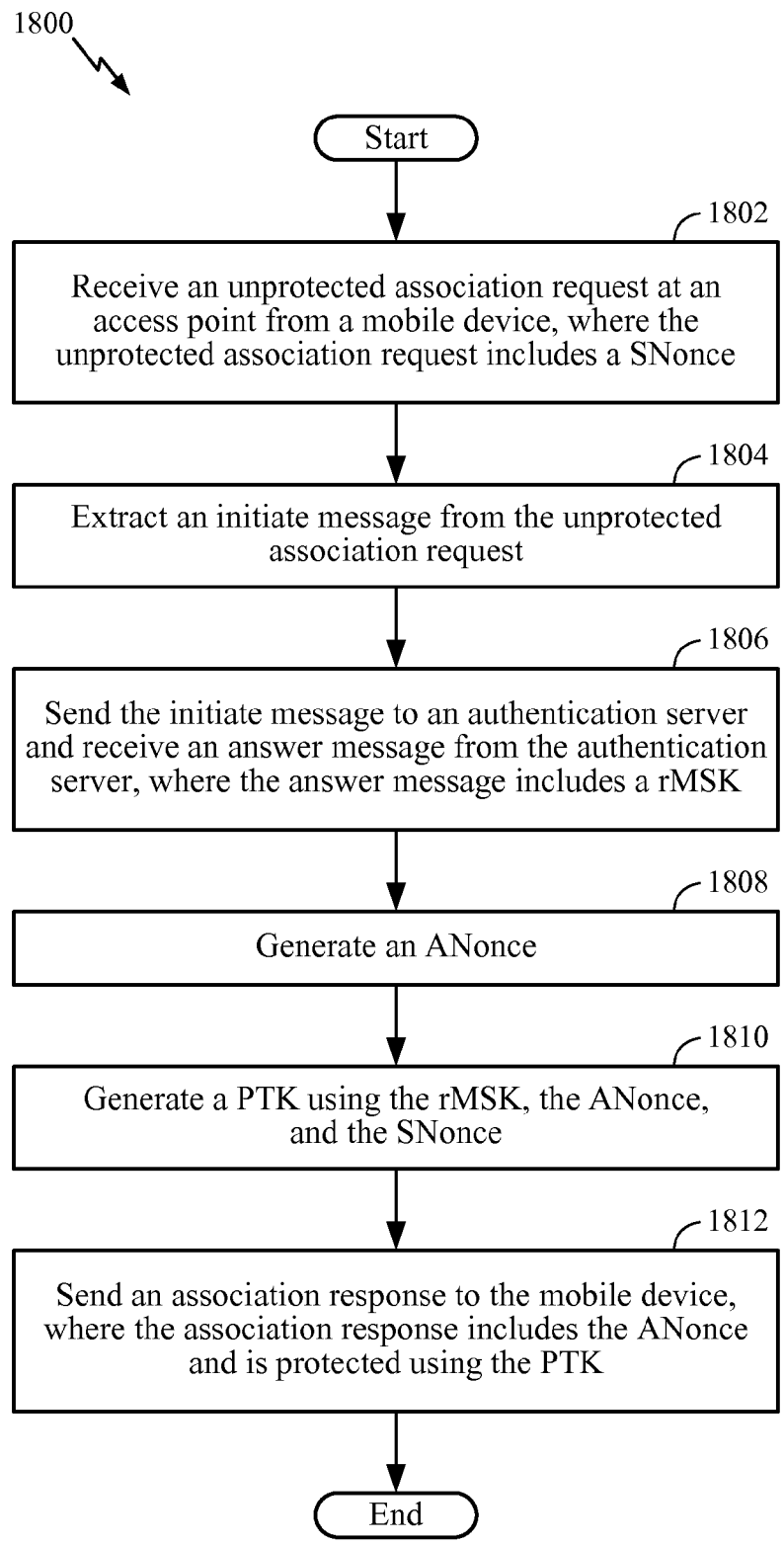
FIG. 18 is a flow diagram showing an exemplary process operable at the access point of FIG. 16 to perform link setup and authentication.

FIG. 18 is a flow diagram showing an exemplary process 1800 operable at the AP 304 of FIG. 16 to perform link setup and authentication. At 1802, an access point may receive an unprotected association request from a mobile device, where the unprotected association request includes a SNonce. Proceeding to 1804, the access point may extract an initiate message from the unprotected association request. Continuing to 1806, the access point may send the initiate message to an authentication server and may receive an answer message from the authentication server, where the answer message includes a rMSK. For example, referring to FIG. 16, the AP 304 may receive the unprotected association request from the STA 302 at step 3 and may receive the rMSK from the AS 308 at step 8.

Advancing to 1808, the access point may generate an ANonce. The access point may also generate a PTK using the rMSK, the ANonce, and the SNonce, at 1810. Continuing to 1812, the access point may send an association response to the mobile device, where the association response includes the ANonce and is protected using the PTK. For example, referring to FIG. 16, the AP 304 may generate the ANonce at step 9, derive the PTK at step 10a, and send the association response to the STA 302 at step 12.

Figure 19:
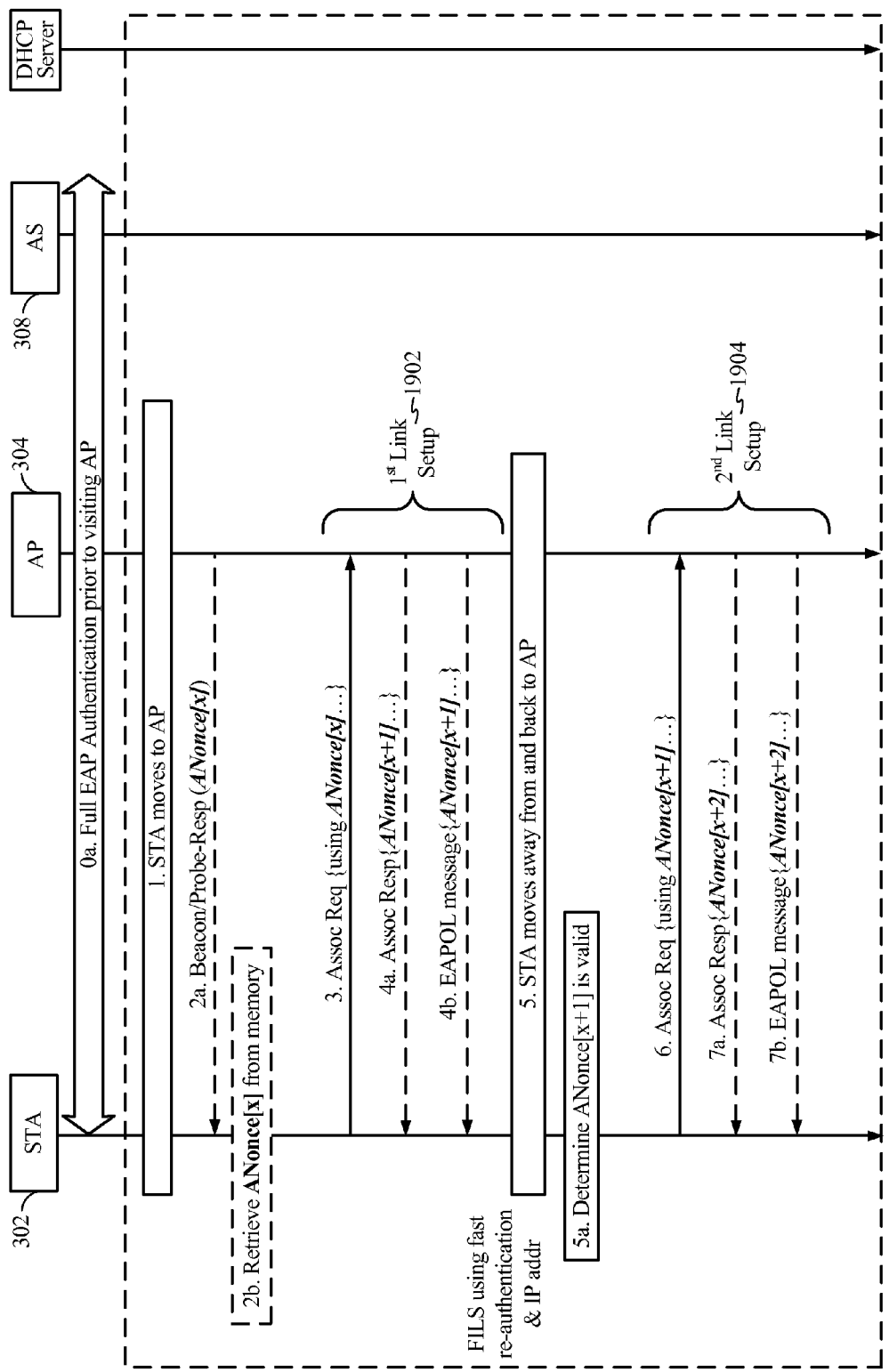
FIG. 19 is a flow diagram illustrating messaging that may be performed according to other aspects of link setup and authentication.

FIG. 19 is a flow diagram illustrating messaging that may be performed according to other aspects of link setup and authentication. In particular, FIG. 19 illustrates providing, during a first link setup a "next" ANonce that can be used during a second link setup subsequent to the first link setup.

Selected messages and operations illustrated in FIG. 16 may correspond to messages and operations illustrated in FIGS. 4-11, with the following modifications. The STA 302 may initiate a first link setup 1902 with the AP 304 using a first ANonce (e.g., ANonce[x]). In a particular embodiment, the first ANonce may have previously been sent by the AP 304 and received by the STA 302 via a beacon or probe response (e.g., as shown at step 2a), retrieved from a memory of the STA 302 (e.g., as shown at step 2b), or any combination thereof.

During the first link setup 1902, the STA 302 may transmit an association request to the AP 304 using the first ANonce (e.g., ANonce[x]). The AP 304 may provide a second ANonce (e.g., ANonce[x+1]) to the STA 302 during the first link setup 1902. The second ANonce may be for use in a subsequent second link setup 1904 with the AP 304. For example, the second ANonce may be provided in an association response (e.g., as shown at step 4a), in an EAPOL message (e.g., as shown at step 4b), or any combination thereof.

When the STA 302 initiates the second link setup 1904 with the AP 304, the STA 302 may use the second ANonce (e.g., ANonce[x+1]) instead of waiting for a beacon or soliciting a probe response. In a particular embodiment, the second ANonce (e.g., ANonce[x+1] may have a validity lifetime that is set by the AP 304, and the STA 302 may determine that the second ANonce is valid, at step 5a, prior to initiating the second link setup 1904. If the second ANonce is determined to be invalid, the STA 302 may proceed as described with reference to FIG. 20.

Upon determining that the second ANonce (e.g., ANonce[x+1]) is valid, the STA may initiate the second link setup 1904 using the second ANonce. During the second link setup 1904, the STA 302 may send a second association request using the second ANonce, as shown at step 6. The STA 302 may also receive a third ANonce (e.g., ANonce[x+2]), to be used in a subsequent third link setup with the AP 304, as shown at step 7a or 7b.

Figure 20:
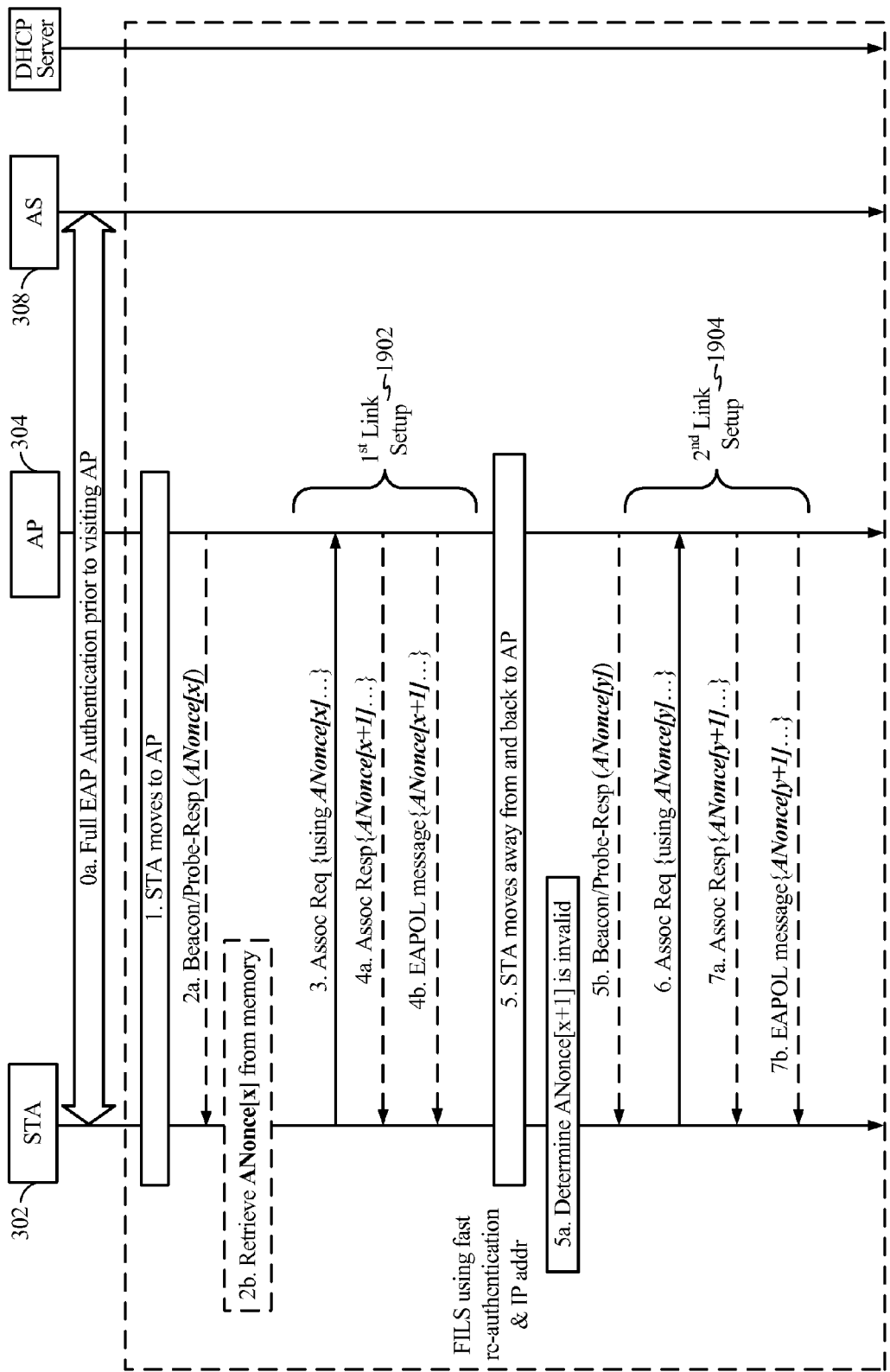
FIG. 20 is a flow diagram illustrating messaging that may be performed according to other aspects of link setup and authentication.

FIG. 20 is a flow diagram illustrating messaging that may be performed according to other aspects of link setup and authentication. The messages and operations illustrated in FIG. 20 may correspond to those shown in FIG. 19 with the following modifications.

At step 5a, the STA 302 may determine that the second ANonce (e.g., ANonce[x+1]) is invalid (e.g., due to expiration of a validity time period). Thus, instead of being able to use the second ANonce during the second link setup 1904, the STA 302 may wait for or solicit a new ANonce (e.g., ANonce[y]) via a beacon or probe response, as shown at step 5b. The new ANonce may then be used to initiate the second link setup 1904. During the second link setup 1904, the STA 302 may receive from the AP 304 another ANonce (e.g., ANonce[y+1]) for use in a subsequent third link setup.

Thus, the embodiments described in FIGS. 19-20 may provide a "next ANonce" to mobile devices, so that a subsequent link setup may be performed faster and may consume less power. In addition, it should be noted that for ease of illustration, the embodiments of FIGS. 19-20 may not include all messaging involved in link setup. For example, messaging related to DHCP operations and messaging between the AP 304 and the AS 308 is not shown.

Figure 21:
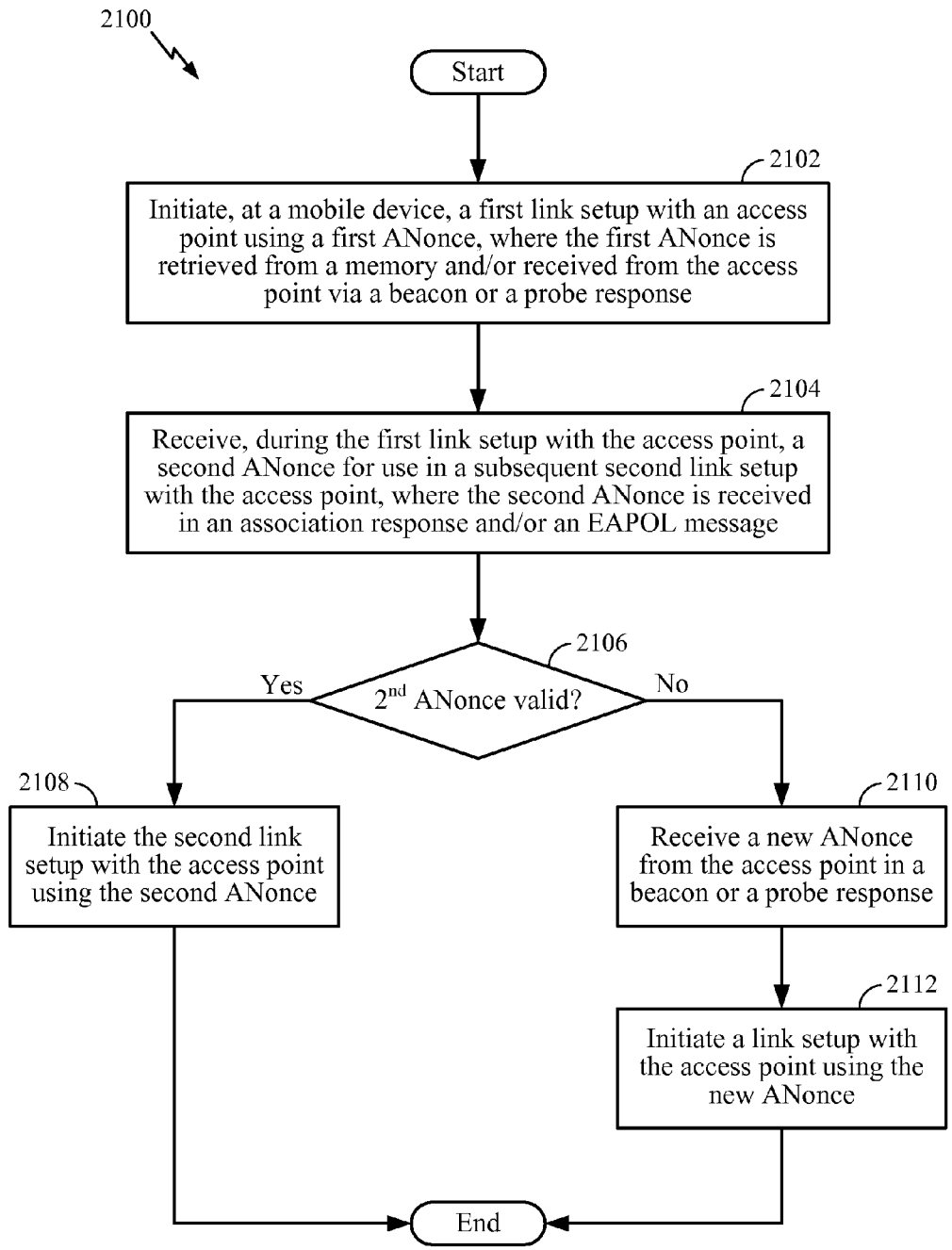
FIG. 21 is a flow diagram showing an exemplary process operable at the station of FIGS. 19-20 to perform link setup and authentication.

FIG. 21 is a flow diagram showing an exemplary process 2100 operable at the STA 302 of FIGS. 19-20 to perform link setup and authentication. At 2102, a mobile device may initiate a first link setup with an access point using a first ANonce. The first ANonce may be retrieved from a memory and/or received from the access point via a beacon or a probe response. Advancing to 2104, the mobile device may receive, during the first link setup with the access point, a second ANonce for use in a subsequent second link setup with the access point. The second ANonce may be received in an association response and/or an EAPOL message. For example, referring to FIGS. 19-20, the STA 302 may initiate the first link setup 1902 using the first ANonce (e.g., ANonce[x]) and may receive the second ANonce (e.g., ANonce[x+1]) during the first link setup 1902.

Continuing to 2106, the mobile device may determine whether the second ANonce is valid. For example, the mobile device may make such a determination prior to initiating the second link setup. To illustrate, the mobile device may use a timer that is sent along with the second ANonce or a pre-configured timer to determine if the second ANonce is valid. When the second ANonce is determined to be valid, the mobile device may initiate the second link setup using the second ANonce, at 2108. For example, referring to FIG. 19, the STA 302 may initiate the second link setup 1904 using the second ANonce (e.g., ANonce[x+1]).

When the second ANonce is determined to be invalid, the mobile device may receive a new ANonce from the access point, at 2110. The new ANonce may be received in a beacon or a probe response. Proceeding to 2112, the mobile device may initiate a link setup with the access point using the new ANonce. For example, referring to FIG. 20, the mobile device may use the new ANonce (e.g., ANonce[y]) for the link setup.

Figure 22:
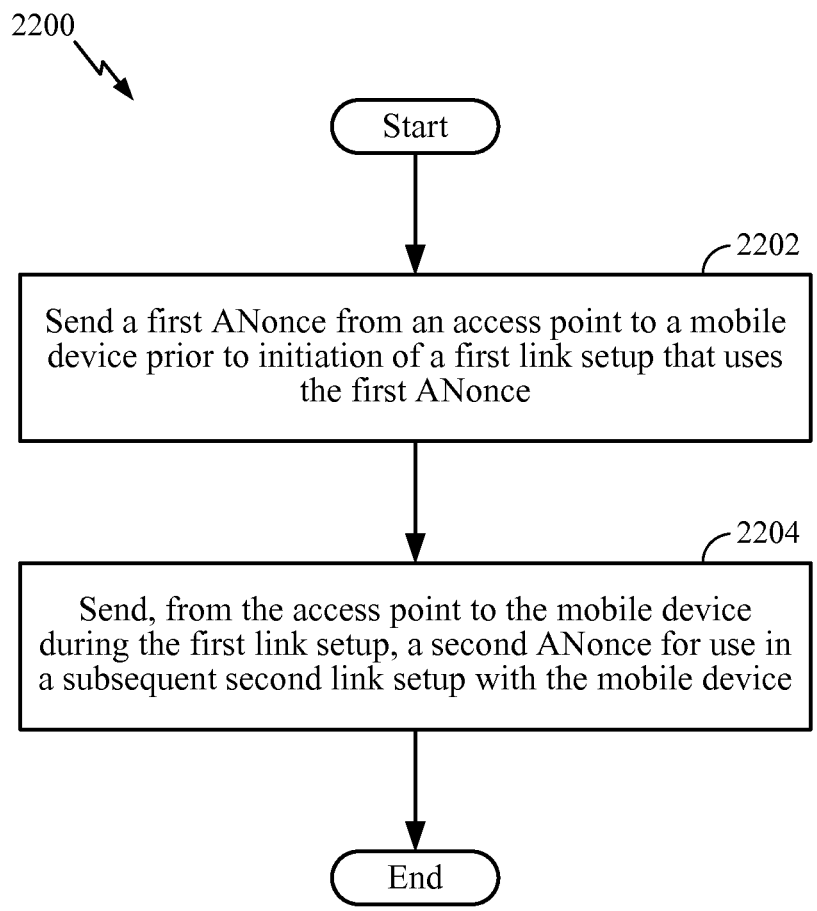
FIG. 22 is a flow diagram showing an exemplary process operable at the access point of FIGS. 19-20 to perform link setup and authentication.

FIG. 22 is a flow diagram showing an exemplary process 2200 operable at the AP 304 of FIGS. 19-20 to perform link setup and authentication. At 2202, an access point may send a first ANonce to a mobile device. The first ANonce may be sent prior to initiation of a first link setup that uses the first ANonce. Advancing to 2204, the access point may send to the mobile device, during the first link setup, a second ANonce for use in a subsequent second link setup with the mobile device. For example, referring to FIGS. 19-20, during the first link setup 1902 that uses the first ANonce (e.g., ANonce[x]), the AP 304 may send to the STA 302 the second ANonce (e.g., ANonce[x+1]) for use in the subsequent second link setup 1904.

Figure 23:
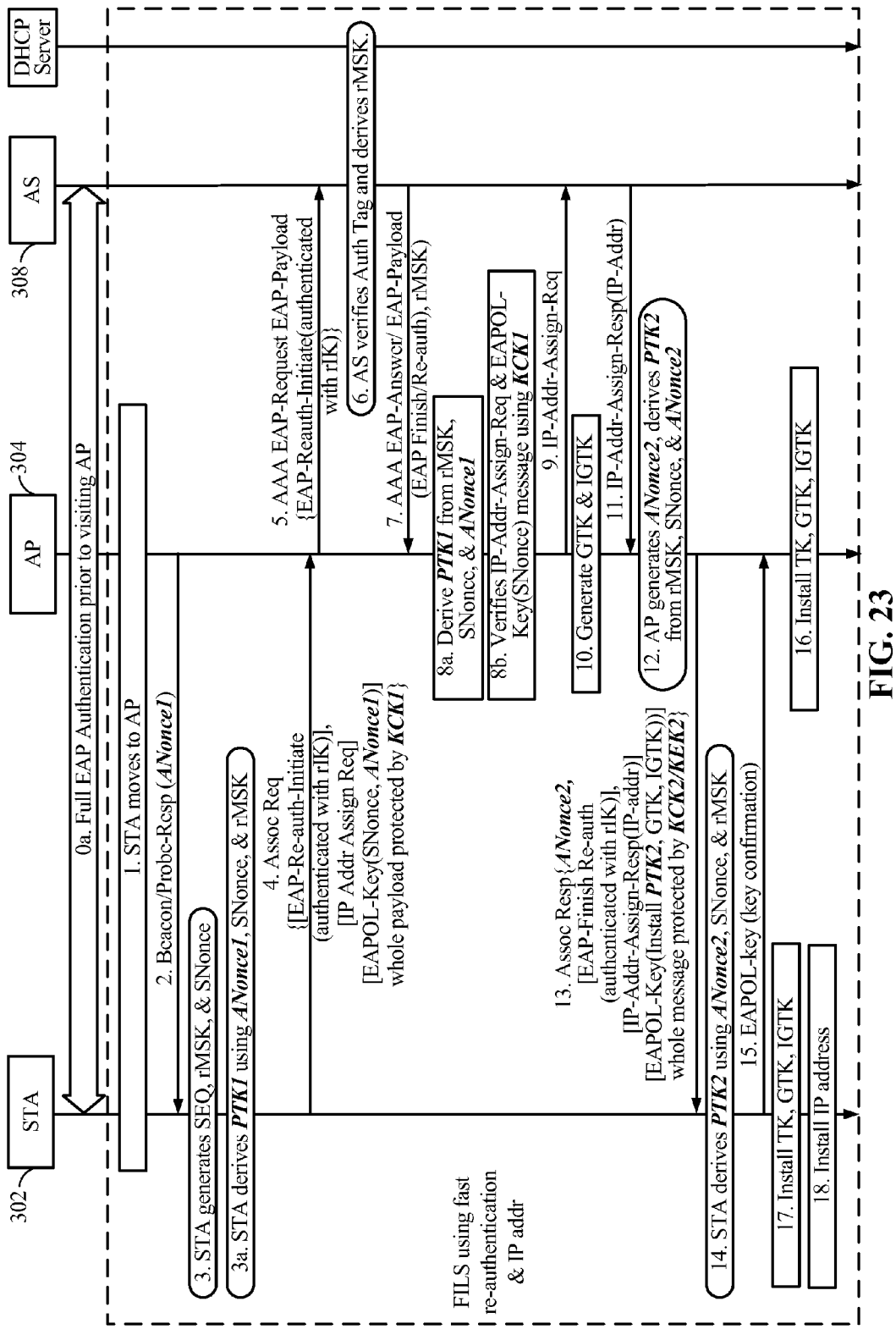
FIG. 23 is a diagram illustrating messaging that may be performed according to other aspects of link setup and authentication.

FIG. 23 is a diagram illustrating messaging that may be performed according to other aspects of link setup and authentication. In particular, FIG. 23 illustrates use of a "temporary" key (e.g., PTK) for upper layer signaling protection during link setup. Since upper layer signaling messages have built-in security protection (between the STA 302 and the authentication server 308), the upper layer signaling messages may be protected using a "weaker" ANonce (e.g., an ANonce that has lower security properties), which may enable a faster signaling procedure for association. A "stronger" ANonce is derived in parallel to the upper layer signaling and is used for further data transfer, as described herein.

Selected messages and operations illustrated in FIG. 23 may correspond to message and operations illustrated in FIGS. 4-11, with the following modifications. The AP 304 may send a first ANonce (e.g., ANonce1) to the STA 302, as shown at step 2. The STA 302 may derive a first PTK (e.g., PTK1) based on ANonce1 and the SNonce of the STA 302, as shown at step 3a. At step 4, the STA 302 may send an association request to the AP 304. The association request may include the SNonce and may be protected using PTK1. To illustrate, the association request may be protected using a first key confirmation key (KCK1) derived from PTK1.

At step 8a, the AP 304 may derive PTK1 based on ANonce1 and the SNonce included in the association request. At step 12, the AP may generate a second ANonce (e.g., ANonce2) and may derive a second PTK (e.g., PTK2) based on ANonce2 and the SNonce. At step 13, the AP 304 may send an association response to the STA 302, where the association response includes ANonce2 and is protected using PTK2. To illustrate, the association response may be protected using a KCK and a key encryption key (KEK) derived based on PTK2. The STA 302 may generate PTK2, at step 14, based on the SNonce and ANonce2 to complete link setup. PTK2 may be used by the STA 302 and the AP 304 to protect subsequent messages (e.g., data messages) communicated between the STA 302 and the AP 304.

Thus, unlike the message flow illustrated in FIG. 16, which involves transmission of an unprotected association request, the message flow of FIG. 23 protects the association request using a "temporary" PTK1. It will be noted that although PTK1 is generated using an ANonce that can be known to multiple STAs (e.g., ANonce1 may be broadcasted to multiple STAs via a beacon), only one message (the association request) is protected using the "temporary" key PTK1. Subsequent messages, including the association response and data messages between the STA 302 and the AP 304, are protected using a different key PTK2. The message flow of FIG. 23 may thus be preferable in situations where the AP is not "known" or "trusted," such as in public access areas.

Figure 24:
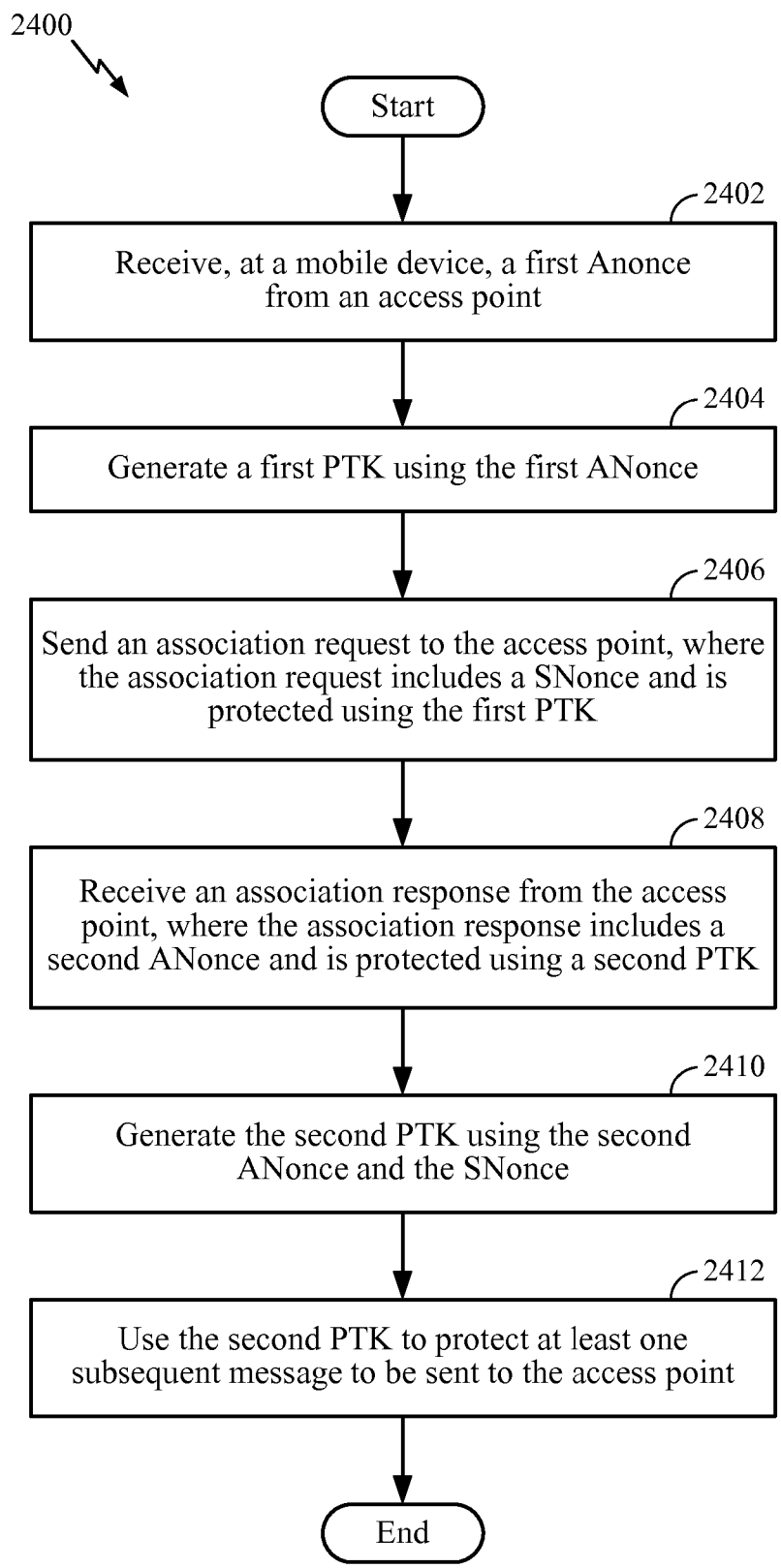
FIG. 24 is a flow diagram showing an exemplary process operable at a station to perform link setup and authentication as shown in FIG. 23.

FIG. 24 is a flow diagram showing an exemplary process 2400 operable at a station, such as the STA 302 that communicates and processes messages as illustrated by FIG. 23, to perform link setup and authentication. At 2402, a mobile device (e.g., the STA 302) may receive a first ANonce (e.g., ANonce1) from an access point (e.g., the AP 304). Advancing to 2404, the mobile device may generate a first PTK (e.g., PTK1) using the first ANonce. Continuing to 2406, the mobile device may send an association request to the access point. The association request may include a SNonce and may be protected using the first PTK.

At 2408, the mobile device may receive an association response from the access point. The association response may include a second ANonce (e.g., ANonce2) and may be protected using a second PTK (e.g., PTK2). Advancing to 2410, the mobile device may generate the second PTK using the second ANonce and the SNonce. Continuing to 2412, the mobile device may use the second PTK to protect one or more subsequent messages to be sent to the access point.

Figure 25:
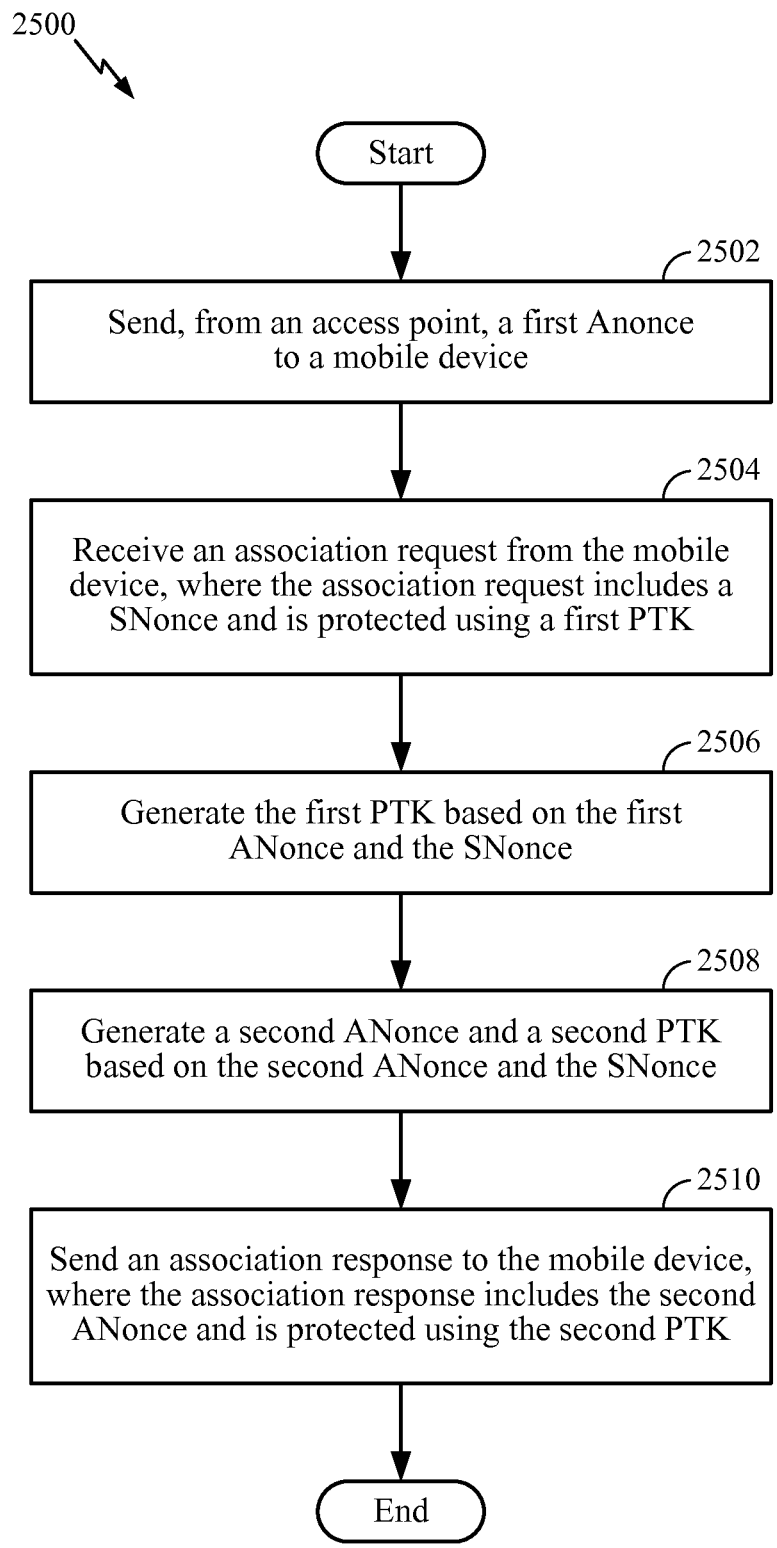
FIG. 25 is a flow diagram showing an exemplary process operable at an access point to perform link setup and authentication as shown in FIG. 23.

FIG. 25 is a flow diagram showing an exemplary process 2500 operable at an access point, such as the AP 304 that communicates and processes messages as illustrated by FIG. 23, to perform link setup and authentication. At 2502, an access point (e.g., the AP 304) may send a first ANonce (e.g., ANonce1) to a mobile device (e.g., the STA 302). For example, the first ANonce may be sent via a unicast probe response or a broadcast beacon. Advancing to 2504, the access point may receive an association request from the mobile device. The association request may include a SNonce and may be protected using a first PTK (e.g., PTK1). At 2506, the access point may generate the first PTK based on the first ANonce and the SNonce.

Continuing to 2508, the access point may generate a second ANonce (e.g., ANonce2) and a second PTK (e.g., PTK2) based on the second ANonce and the SNonce. At 2510, the access point may send an association response to the mobile device. The association response may include the second ANonce and may be protected using the second PTK.

Figure 26:
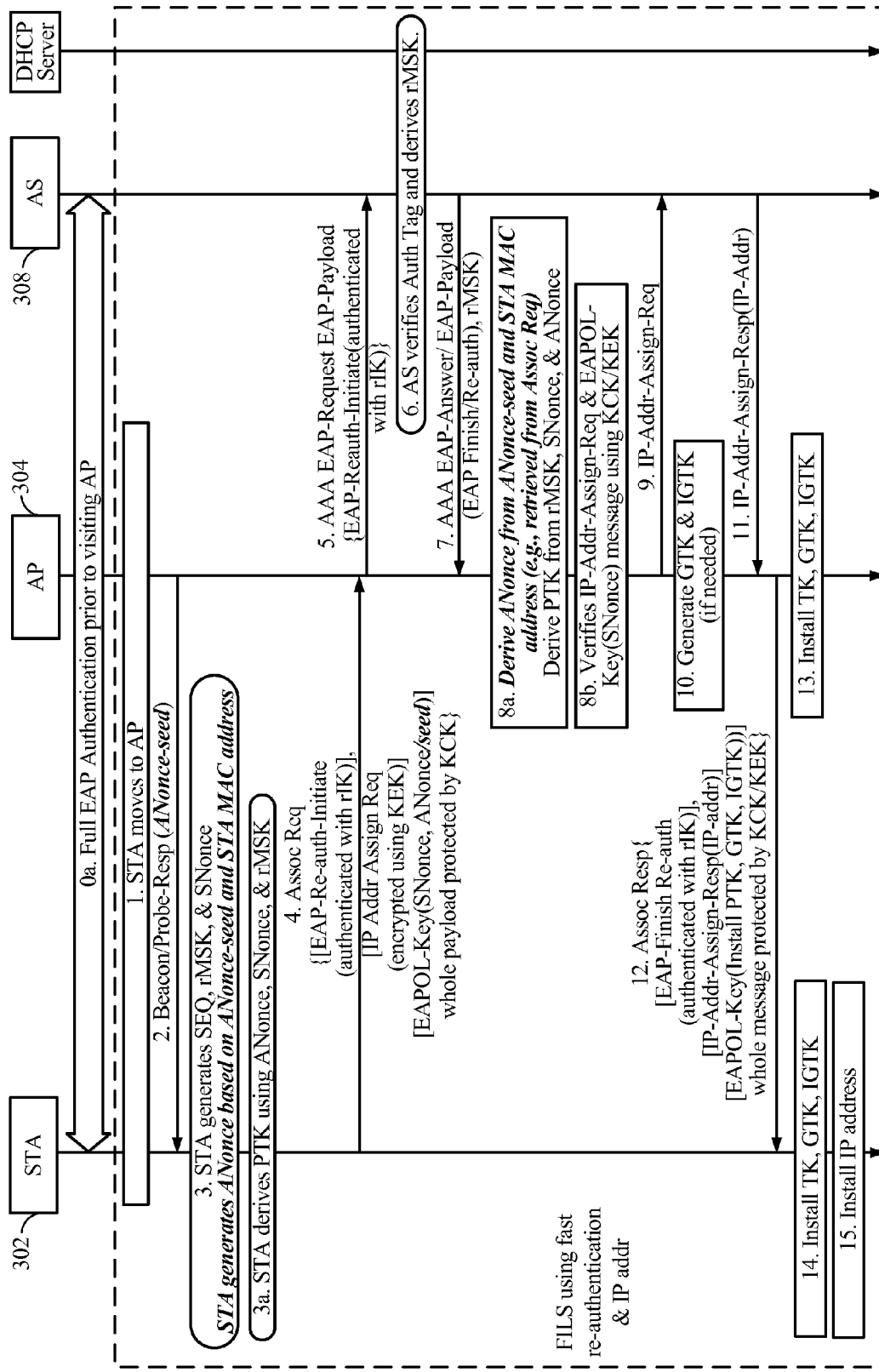
FIG. 26 is a diagram illustrating messaging that may be performed according to other aspects of link setup and authentication.

FIG. 26 is a diagram illustrating messaging that may be performed according to other aspects of link setup and authentication. In particular, FIG. 26 illustrates use of an ANonce-seed to generate an ANonce.

Selected messages and operations illustrated in FIG. 26 may correspond to messages and operations illustrated in FIGS. 4-11, with the following modifications. The AP 304 may send an ANonce-seed to the STA 302 in a beacon or probe response, as shown at step 2. In a particular embodiment, the ANonce-seed is a 64-bit cryptographic seed value that is frequently updated by the AP 304. In a particular embodiment, the ANonce-seed is broadcast to a plurality of STAs (e.g., in a beacon). The STA 302 may use the ANonce-seed to generate a device specific ANonce, as shown at step 3. In a particular embodiment, the ANonce is generated be performing a function (e.g., a hashing function) on the ANonce-seed and a value unique to and/or descriptive of the STA 302 (e.g., a MAC address of the STA 302 or some other value associated with the STA 302). It will be appreciated that unlike an ANonce broadcasted to multiple STAs, the ANonce generated in step 3 may be unique to the STA 302. The STA 302 may perform a link setup with the AP 304 based on the generated ANonce.

At step 8a, the AP 304 may derive the ANonce based on the ANonce-seed and the MAC address of the STA 302. For example, the MAC address of the STA 302 may be retrieved by the AP 304 from the association response sent in step 4. The AP 304 may perform and complete the link setup with the STA 302 after generating the ANonce.

It will be noted that unlike other handshaking techniques, the embodiment of FIG. 26 involves the STA 302 generating the ANonce before the AP 304. However, to preserve backward compatibility, the ANonce generated in accordance with the ANonce-seed techniques of FIG. 26 may share similar properties to ANonces in handshaking techniques. For example, the ANonce may be unique to the STA 302, the ANonce and/or ANonce-seed may be sent "in the clear" (e.g., using a beacon or probe response message as shown at step 2 or an EAPOL-Key message as shown at step 4), and the ANonce may not be predictable by unauthorized devices before transmission by the AP 304.

Figure 27:
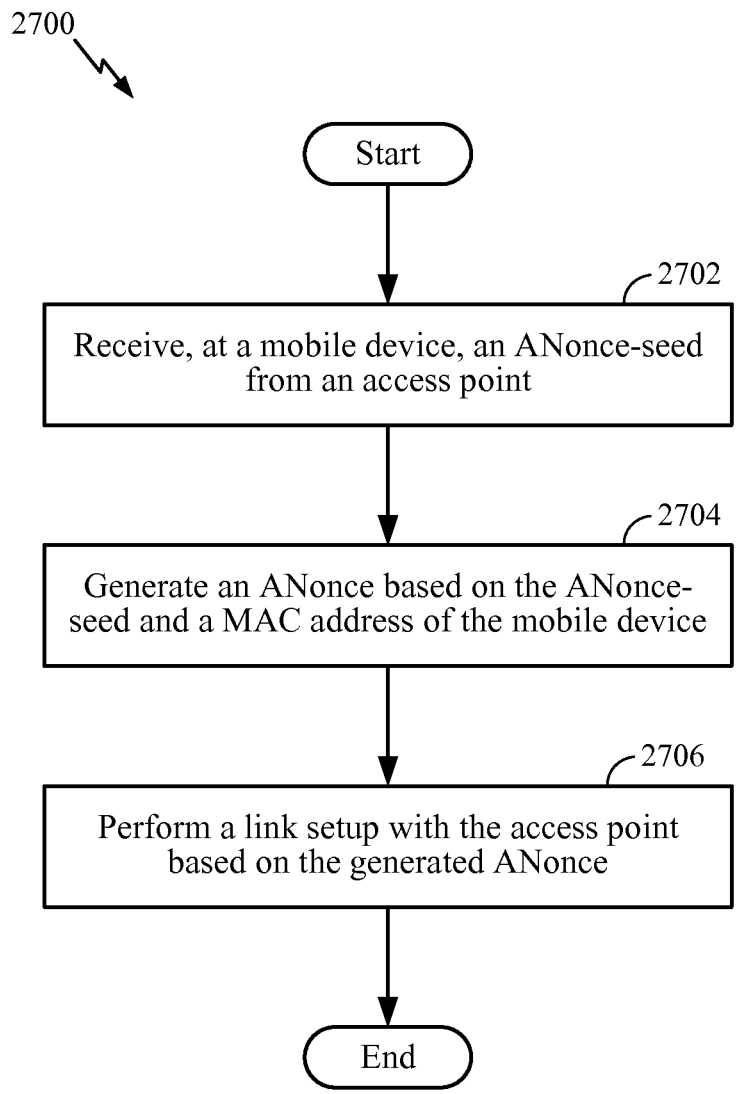
FIG. 27 is a flow diagram showing an exemplary process operable at a station to perform link setup and authentication as shown in FIG. 26.

FIG. 27 is a flow diagram showing an exemplary process 2700 operable at a station, such as the STA 302 that communicates and processes messages as illustrated by FIG. 26, to perform link setup and authentication. At 2702, a mobile device (e.g., the STA 302) may receive an ANonce-seed from an access point (e.g., the AP 304). Advancing to 2704, the mobile device may generate an ANonce based on the ANonce-seed and a MAC address of the mobile device. Continuing to 2706, the mobile device may perform a link setup with the access point based on the generated ANonce.

Figure 28:
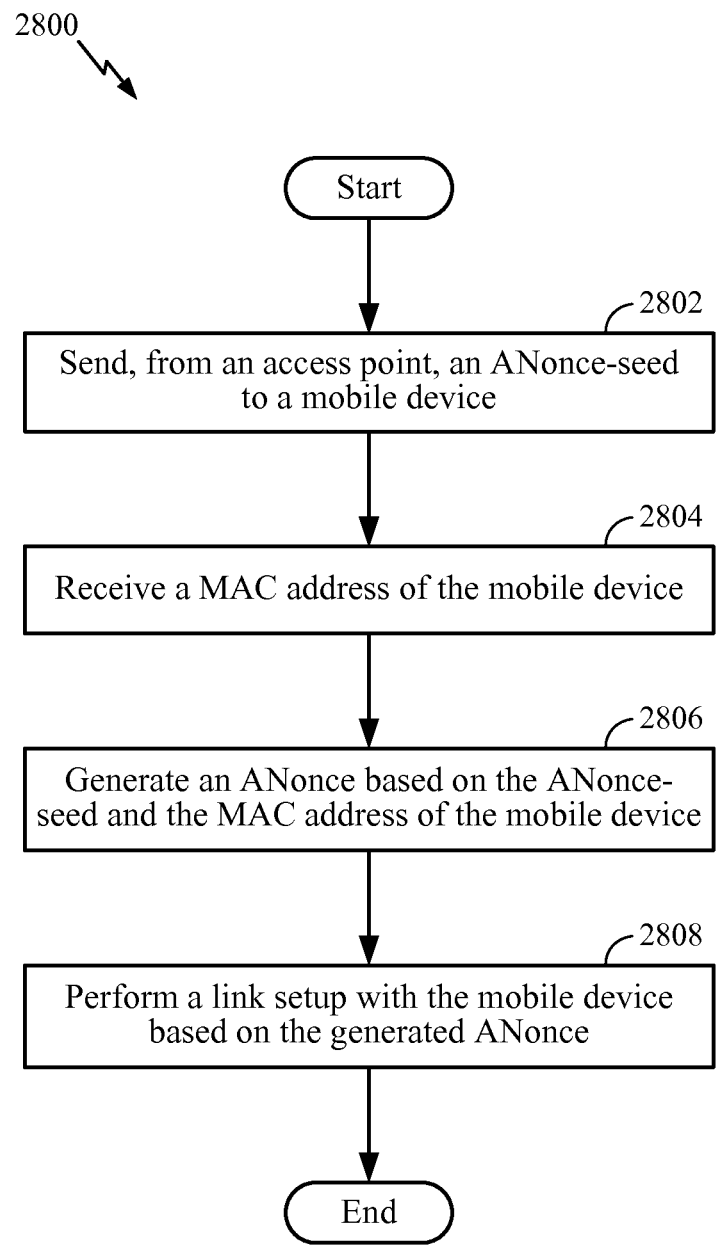
FIG. 28 is a flow diagram showing an exemplary process operable at an access point to perform link setup and authentication as shown in FIG. 26.

FIG. 28 is a flow diagram showing an exemplary process 2800 operable at an access point, such as the AP 304 that communicates and processes messages as illustrated by FIG. 26, to perform link setup and authentication. At 2802, an access point (e.g., the AP 304) may send an ANonce-seed to a mobile device (e.g., the STA 302). Advancing to 2804, the access point may receive a MAC address of the mobile device. For example, the MAC address may be included in a message from the mobile device, such as an association request. Continuing to 2806, the access point may generate an ANonce based on the ANonce-seed and the MAC address of the mobile device. At 2808, the access point may verify the authenticity of the mobile device by comparing the ANonce reported by the mobile device to the ANonce computed by the access point. If the mobile device passes the verification, then the access point may perform a link setup with the mobile device based on the generated ANonce.

It should be noted that although various embodiments and options may be described herein as alternatives, different characteristics from different embodiments and options may be combined to perform link setup an authentication.

Various techniques described herein may be applied to pull-based and push-based data scenarios. For example, the modified 4-way handshake described with reference to FIGS. 16-18 and the "next" ANonce technique described with reference to FIGS. 19-22 may be applied to pull-based and push-based data scenarios. One or more applications executed by a mobile device, such as e-mail and social networking applications, may periodically check for data updates. The modified 4-way handshake or "next" ANonce technique may enable such data update pulls to occur faster and with reduced battery consumption at the mobile device. As another example, application(s) at the mobile device may be configured to receive pushed data updates (e.g., from servers). An initial portion of a data update may be received over a cellular connection. However, the remainder of the data update may be received faster (e.g., over WiFi) and/or with reduced battery consumption because the initial portion of the data update triggers a fast initial link setup using the modified 4-way handshake or "next" ANonce technique as described herein. The temporary PTK technique described with reference to FIGS. 23-25 and the ANonce-seed technique described with reference to FIGS. 26-28 may also be used in such pull-based and push-based data scenarios.

In conjunction with the described embodiments, a first apparatus may include means for sending an unprotected association request from a mobile device to an access point. For example, the means for sending may include one or more components of the STAs 106-110, the wireless controller 240, the antenna 242, one or more components of the STA 302, one or more other devices configured to send an unprotected association request, or any combination thereof. The first apparatus may also include means for receiving an association response from the access point, where the association response includes an ANonce. For example, the means for receiving may include one or more components of the STAs 106-110, the wireless controller 240, the antenna 242, one or more components of the STA 302, one or more other devices configured to receive an association response, or any combination thereof. The first apparatus may further include means for generating, at the mobile device, a PTK using the ANonce. For example, the means for generating may include one or more components of the STAs 106-110, the processor 210, one or more components of the STA 302, one or more other devices configured to generate a PTK, or any combination thereof.

A second apparatus may include means for receiving an unprotected association request at an access point from a mobile device. For example, the means for receiving the unprotected association request may include one or more components of the AP 102, one or more components of the AP 304, one or more other devices configured to receive an unprotected association request (e.g., a wireless controller and/or antenna of an AP), or any combination thereof. The second apparatus may also include means for extracting an initiate message from the unprotected association request. For example, the means for extracting may include one or more components of the AP 102, one or more components of the AP 304, one or more other devices configured to extract an initiate message (e.g., a processor of an AP), or any combination thereof. The second apparatus may further include means for sending the initiate message to an AS. For example, the means for sending the initiate message may include one or more components of the AP 102, one or more components of the AP 304, one or more other devices configured to send an initiate message (e.g., a wireless controller and/or antenna of an AP), or any combination thereof.

The second apparatus may include means for receiving an answer message from the AS, where the answer message includes a rMSK. For example, the means for receiving the answer message may include one or more components of the AP 102, one or more components of the AP 304, one or more other devices configured to receive an answer message (e.g., a wireless controller and/or antenna of an AP), or any combination thereof. The second apparatus may also include means for generating an ANonce. For example, the means for generating may include one or more components of the AP 102, one or more components of the AP 304, one or more other devices configured to generate an ANonce (e.g., a processor of an AP), or any combination thereof. The second apparatus may further include means for sending an association response from the access point to the mobile device, where the association response includes the ANonce. For example, the means for sending the association response may include one or more components of the AP 102, one or more components of the AP 304, one or more other devices configured to send an association response (e.g., a wireless controller and/or antenna of an AP), or any combination thereof.

A third apparatus may include means for means for initiating, at a mobile device, a first link setup with an access point using a first ANonce. For example, the means for initiating may include one or more components of the STAs 106-110, the processor 210, one or more components of the STA 302, one or more other devices configured to initiate a link setup, or any combination thereof. The third apparatus may also include means for receiving, during the first link setup with the access point, a second ANonce for use in a second link setup with the access point subsequent to the first link setup. For example, the means for receiving may include one or more components of the STAs 106-110, the wireless controller 240, the antenna 242, one or more components of the STA 302, one or more other devices configured to receive an ANonce, or any combination thereof.

A fourth apparatus may include means for sending, from an access point to a mobile device during a first link setup that uses a first ANonce, a second ANonce for use in a second link setup with the mobile device subsequent to the first link setup. For example, the means for sending the second ANonce may include one or more components of the AP 102, one or more components of the AP 304, one or more other devices configured to send an ANonce (e.g., a wireless controller and/or antenna of an AP), or any combination thereof. The fourth apparatus may also include means for sending the first ANonce to the mobile device via a beacon or a probe response prior to initiation of the first link setup, where the second ANonce is distinct from the first ANonce. For example, the means for sending the first ANonce may include one or more components of the AP 102, one or more components of the AP 304, one or more other devices configured to send an ANonce (e.g., a wireless controller and/or antenna of an AP), or any combination thereof.

A fifth apparatus may include means for receiving, at a mobile device, a first ANonce from an access point. For example, the means for receiving may include one or more components of the STAs 106-110, the wireless controller 240, the antenna 242, one or more components of the STA 302, one or more other devices configured to receive an ANonce, or any combination thereof. The apparatus may also include means for generating a first PTK using the first ANonce. For example, the means for generating may include one or more components of the STAs 106-110, the processor 210, one or more components of the STA 302, one or more other devices configured to generate a PTK, or any combination thereof. The first ANonce may be considered a "weak" ANonce, for example due to being broadcast to multiple STAs in a beacon or due to being predictable in value. However, the use of such a "weak" ANonce may be acceptable because of implicit security embedded in upper layer signaling messages. Moreover, a second, "stronger" ANonce may be derived and used for further data transfer, as described herein.

The apparatus may further include means for sending an association request to the access point, where the association request includes a SNonce and is protected using the first PTK. For example, the means for sending may include one or more components of the STAs 106-110, the wireless controller 240, the antenna 242, one or more components of the STA 302, one or more other devices configured to send an association request, or any combination thereof.

The apparatus may include means for receiving, at the mobile device, an association response from the access point, where the association response includes a second ANonce and is protected using a second PTK. For example, the means for receiving may include one or more components of the STAs 106-110, the wireless controller 240, the antenna 242, one or more components of the STA 302, one or more other devices configured to receive an association response, or any combination thereof. The second ANonce may be considered a "strong" ANonce.

The apparatus may also include means for generating, at the mobile device, the second PTK using the second ANonce and the SNonce. For example, the means for generating may include one or more components of the STAs 106-110, the processor 210, one or more components of the STA 302, one or more other devices configured to generate a PTK, or any combination thereof. The apparatus may further include means for using the second PTK to protect at least one subsequent message to be sent from the mobile device to the access point. For example, the means for using may include one or more components of the STAs 106-110, the processor 210, one or more components of the STA 302, one or more other devices configured to protect a message, or any combination thereof.

A sixth apparatus may include means for sending, from an access point, a first ANonce to a mobile device. For example, the means for sending may include one or more components of the AP 102, one or more components of the AP 304, one or more other devices configured to send an ANonce, or any combination thereof. The apparatus may also include means for receiving an association request from the mobile device, where the association request includes a SNonce and is protected using a first PTK. For example, the means for receiving may include one or more components of the AP 102, one or more components of the AP 304, one or more other devices configured to receive an association request, or any combination thereof.

The apparatus may further include means for generating, at the access point, the first PTK based on the first ANonce and the SNonce. For example, the means for generating may include one or more components of the AP 102, one or more components of the AP 304, one or more other devices configured to generate a PTK, or any combination thereof.

The apparatus may include means for generating a second ANonce. For example, the means for generating a second ANonce may include one or more components of the AP 102, one or more components of the AP 304, one or more other devices configured to generate an ANonce, or any combination thereof. The apparatus may also include means for generating a second PTK based on the second ANonce and the SNonce. For example, the means for generating may include one or more components of the AP 102, one or more components of the AP 304, one or more other devices configured to generate a PTK, or any combination thereof.

The apparatus may further include means for sending an association response to the mobile device, where the association response includes the second ANonce and is protected using the second PTK. For example, the means for sending may include one or more components of the AP 102, one or more components of the AP 304, one or more other devices configured to send an association response, or any combination thereof.

A seventh apparatus may include means for receiving, at a mobile device, an ANonce-seed from an access point. The ANonce-seed may be broadcasted to a plurality of devices (e.g., via a beacon). For example, the means for receiving an ANonce-seed may include one or more components of the STAs 106-110, the wireless controller 240, the antenna 242, one or more components of the STA 302, one or more other devices configured to receive an ANonce-seed, or any combination thereof. The apparatus may also include means for generating, at the mobile device, an ANonce based on the ANonce-seed and a MAC address of the mobile device. For example, the means for generating may include one or more components of the STAs 106-110, the processor 210, one or more components of the STA 302, one or more other devices configured to generate an ANonce, or any combination thereof.

The apparatus may further include means for performing a link setup with the access point based on the generated ANonce. For example, the means for performing may include one or more components of the STAs 106-110, the processor 210, one or more components of the STA 302, one or more other devices configured to perform a link setup, or any combination thereof.

An eighth apparatus may include means for sending, from an access point, an ANonce-seed to a mobile device. For example, the means for sending may include one or more components of the AP 102, one or more components of the AP 304, one or more other devices configured to send an ANonce-seed, or any combination thereof.

The apparatus may also include means for receiving a MAC address of the mobile device. For example, the means for receiving may include one or more components of the AP 102, one or more components of the AP 304, one or more other devices configured to receive a MAC address, or any combination thereof. The apparatus may further include means for generating an ANonce based on the ANonce-seed and the MAC address of the mobile device. For example, the means for generating may include one or more components of the AP 102, one or more components of the AP 304, one or more other devices configured to generate an ANonce, or any combination thereof.

The apparatus may include means for performing a link setup with the mobile device based on the generated ANonce. For example, the means for performing may include one or more components of the AP 102, one or more components of the AP 304, one or more other devices configured to perform a link setup, or any combination thereof.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully described.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Specific implementations shown and described are only examples and should not be construed as the only way to implement the present disclosure unless specified otherwise herein. It is readily apparent to one of ordinary skill in the art that the various examples in the present disclosure may be practiced by numerous other partitioning systems.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

In the description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It is readily apparent to one of ordinary skill in the art that the present disclosure may be practiced by numerous other partitioning systems. For the most part, details concerning timing considerations and the like have been omitted where such details are not necessary to obtain a complete understanding of the present disclosure and are within the abilities of persons of ordinary skill in the relevant art.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the invention. The algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium," "computer-readable medium," and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing embodiments described herein, is considered a special purpose processor for carrying out such embodiments. Similarly, a general-purpose computer is considered a special purpose computer when configured for carrying out embodiments described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

For example, STA functionality may be implemented using instructions stored on a processor-readable medium. A particular medium may store instructions executable to cause a processor to generate an unprotected association request to be sent by a mobile device to an access point. The instructions may also be executable to cause the processor to generate a PTK using an ANonce retrieved from an association response from the access point. Another particular medium may store instructions executable by a processor to initiate, at a mobile device, a first link setup with an access point using a first ANonce. The instructions may also be executable to cause the processor to receive, during the first link setup with the access point, a second ANonce for use in a second link setup with the access point subsequent to the first link setup.

As another example, AP functionality may be implemented using instructions stored on a processor-readable medium. For example, a particular medium may store instructions executable to cause a processor to extract an initiate message from an unprotected association request received from a mobile device. The instructions may also be executable to cause the processor to extract a rMSK from an answer message received from an authentication server responsive to the initiate message. The instructions may further be executable to cause the processor to generate an ANonce and to generate an association response to be sent to the mobile device, where the association response includes the ANonce. Another particular medium may store instructions executable by a processor to send, from an access point to a mobile device during a first link setup that uses a first ANonce, a second ANonce for use in a second link setup with the mobile device subsequent to the first link setup.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or a combination thereof depends upon the particular application and design selections imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method comprising:
sending a request from a mobile device to an access point, wherein the request includes a station nonce (SNonce) associated with the mobile device and an Extensible Authentication Protocol (EAP)-re-authentication-Initiate message, wherein the EAP-re-authentication-Initiate message is included in a first information element of the request and the SNonce is included in a second information element of the request, the first information element distinct from the second information element;
receiving a response from the access point in response to the request, wherein the response includes:
an authentication parameter based on the EAP-re-authentication-Initiate message,
and
an access point nonce (ANonce) that was generated after the request was sent; and
generating, at the mobile device, a pairwise transient key (PTK) using the SNonce and the ANonce that was received in the response.

2. The method of claim 1, further comprising:
generating, at the mobile device, a re-authentication master session key (rMSK) and the SNonce prior to sending the request to the access point,
wherein the PTK is generated using the rMSK.

3. The method of claim 1, further comprising:
retrieving a basic service set identifier (BSSID) of the access point from a memory of the mobile device,
wherein the request is sent to the access point based on the BSSID.

4. The method of claim 1, wherein the request is sent responsive to location information determined at the mobile device.

5. The method of claim 1, wherein information elements in the response other than the ANonce are protected using the ANonce, and further comprising validating integrity of the response using the PTK.

6. The method of claim 1, wherein the response includes an EAP-finish message.

7. The method of claim 6, further comprising decrypting the EAP-finish message based on the PTK.

8. The method of claim 6, wherein the EAP-finish message is included in a third information element of the response and the ANonce is included in a fourth information element of the response, the third information element distinct from the fourth information element.

9. The method of claim 1, wherein the authentication parameter includes an EAP-Finish Re-authentication message.

10. The method of claim 1, wherein the request includes a Dynamic Host Configuration Protocol (DHCP)-Discover-with-Rapid-Commit message.

11. The method of claim 1, wherein the response includes a Dynamic Host Configuration Protocol (DHCP)-Acknowledge-with-Rapid-Commit message.

12. An apparatus comprising:
a processor; and
a memory storing instructions executable by the processor to:
send a request to an access point, wherein the request includes a station nonce (SNonce) associated with a mobile device and an Extensible Authentication Protocol (EAP)-re-authentication-Initiate message, wherein the EAP-re-authentication-Initiate message is included in a first information element of the request and the SNonce is included in a second information element of the request, the first information element distinct from the second information element;
receive a response from the access point in response to the request, wherein the response includes:
an authentication parameter based on the EAP-re-authentication-Initiate message,
and
an access point nonce (ANonce) that was generated after the request was sent; and
generate a pairwise transient key (PTK) using the SNonce and the ANonce that was received in the response.

13. The apparatus of claim 12, wherein the instructions are further executable by the processor to:
generate a re-authentication master session key (rMSK) and the SNonce prior to sending the request to the access point,
wherein the PTK is generated using the rMSK.

14. The apparatus of claim 12, wherein the memory further stores a basic service set identifier (BSSID) of the access point, and wherein the instructions are further executable by the processor to:
retrieve the BSSID of the access point from the memory, wherein the request is sent to the access point based on the BSSID.

15. The apparatus of claim 12, wherein the authentication parameter includes an EAP-Finish Re-authentication message.

16. An apparatus comprising:
means for sending a request from a mobile device to an access point, wherein the request includes a station nonce (SNonce) associated with the mobile device and an Extensible Authentication Protocol (EAP)-re-authentication-Initiate message, wherein the EAP-re-authentication-Initiate message is included in a first information element of the request and the SNonce is included in a second information element of the request, the first information element distinct from the second information element;
means for receiving a response from the access point in response to the request, wherein the response includes:
an authentication parameter based on the EAP-re-authentication-Initiate message; and
an access point nonce (ANonce) that was generated after the request was sent; and
means for generating, at the mobile device, a pairwise transient key (PTK) using the SNonce and the ANonce that was received in the response.

17. The apparatus of claim 16, wherein the authentication parameter includes an EAP-Finish Re-authentication message.

18. A non-transitory processor-readable medium comprising instructions that, when executed by a processor, cause the processor to:
- generate a request to be sent by a mobile device to an access point, wherein the request includes a station nonce (SNonce) associated with the mobile device and an Extensible Authentication Protocol (EAP)-re-authentication-Initiate message, wherein the EAP-re-authentication-Initiate message is included in a first information element of the request and the SNonce is included in a second information element of the request, the first information element distinct from the second information element; and
- generate a pairwise transient key (PTK) using the SNonce and an access point nonce (ANonce) that was generated after the request was sent and was retrieved from a response from the access point responsive to the request, wherein the response includes an authentication parameter based on the EAP-re-authentication-Initiate message.

19. The non-transitory processor-readable medium of claim 18, wherein the authentication parameter includes an EAP-Finish Re-authentication message.

* * * * *